United States Patent
Catovic et al.

(10) Patent No.: US 8,929,894 B2
(45) Date of Patent: Jan. 6, 2015

(54) HANDOVER FAILURE MESSAGING SCHEMES

(75) Inventors: Amer Catovic, San Diego, CA (US);
Parag A. Agashe, San Diego, CA (US);
Rajarshi Gupta, Santa Clara, CA (US);
Gavin B. Horn, La Jolla, CA (US);
Rajat Prakash, La Jolla, CA (US);
Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 779 days.

(21) Appl. No.: 12/651,746

(22) Filed: Jan. 4, 2010

(65) Prior Publication Data

US 2010/0173633 A1 Jul. 8, 2010

Related U.S. Application Data

(60) Provisional application No. 61/142,862, filed on Jan. 6, 2009, provisional application No. 61/158,993, filed on Mar. 10, 2009, provisional application No. 61/160,218, filed on Mar. 13, 2009, provisional application No. 61/158,988, filed on Mar. 10, 2009, provisional application No. 61/160,222, filed on Mar. 13, 2009.

(51) Int. Cl.
*H04W 36/00* (2009.01)
*H04W 36/30* (2009.01)
*H04W 24/02* (2009.01)

(52) U.S. Cl.
CPC .............. *H04W 36/30* (2013.01); *H04W 24/02* (2013.01)
USPC ........... 455/436; 455/423; 455/439; 370/216; 370/242

(58) Field of Classification Search
CPC ... H04W 76/028; H04W 36/08; H04W 92/20; H04W 4/001; H04W 76/027
USPC .......... 455/436, 423, 442; 370/331, 216, 236, 370/2
See application file for complete search history.

(56) References Cited

U.S. PATENT DOCUMENTS 6,389,285 B1  5/2002 Escamilla et al.
6,879,830 B1* 4/2005 Vollmer et al. ............... 455/442

(Continued)

FOREIGN PATENT DOCUMENTS

CN 1659920 A 8/2005
CN 1889785 A 1/2007

(Continued)

OTHER PUBLICATIONS

Huawei, "RLF Analysis" 3GPP Draft; R2-081697 3rd Generation Partnership Project (3GPP) Mobile Competence Centre; 650 Route Des Locioles, F-06921 Sophia-Antipolis Cedex, France, VOL RAN WG2, No. Shenzhen China Mar. 25, 2008.

(Continued)

*Primary Examiner* — Christopher M Brandt
*Assistant Examiner* — Joseph Dean, Jr.
(74) *Attorney, Agent, or Firm* — John J. Ketchum

(57) ABSTRACT

Handover parameter settings are automatically adapted in access points in a system to improve handover performance. Reactive detection techniques are employed for identifying different types of handover-related failures and adapting handover parameters based on this detection. Messaging schemes are also employed for providing handover-related information to access points. Proactive detection techniques also may be used for identifying conditions that may lead to handover-related failures and then adapting handover parameters in an attempt to prevent such handover-related failures. Ping-ponging may be mitigated by adapting handover parameters based on analysis of access terminal visited cell history acquired by access points in the system. In addition, configurable parameters (e.g., timer values) may be used to detect handover-related failures.

69 Claims, 24 Drawing Sheets

(56) References Cited

U.S. PATENT DOCUMENTS

| | | | |
|---|---|---|---|
| 7,089,007 B2 | 8/2006 | Wakuta et al. | |
| 7,206,579 B2 | 4/2007 | Gwon et al. | |
| 2002/0102977 A1 | 8/2002 | Shi | |
| 2003/0008645 A1 | 1/2003 | Oldenburg et al. | |
| 2003/0119508 A1 | 6/2003 | Gwon et al. | |
| 2005/0221824 A1 | 10/2005 | Lee et al. | |
| 2005/0221828 A1 | 10/2005 | Wakuta et al. | |
| 2007/0161374 A1* | 7/2007 | Kienstra et al. | 455/436 |
| 2007/0238464 A1* | 10/2007 | Lim et al. | 455/436 |
| 2007/0253372 A1* | 11/2007 | Nakayasu | 370/331 |
| 2008/0020770 A1 | 1/2008 | Hofmann | |
| 2008/0242292 A1* | 10/2008 | Koskela et al. | 455/423 |
| 2009/0046573 A1* | 2/2009 | Damnjanovic | 370/216 |
| 2009/0175175 A1* | 7/2009 | Somasundaram et al. | 370/242 |
| 2010/0056157 A1* | 3/2010 | Verona et al. | 455/438 |
| 2010/0075675 A1* | 3/2010 | Yang et al. | 455/436 |
| 2010/0124173 A1* | 5/2010 | Agashe et al. | 370/245 |
| 2010/0124918 A1* | 5/2010 | Agashe et al. | 455/423 |
| 2010/0173626 A1 | 7/2010 | Catovic et al. | |
| 2011/0080825 A1* | 4/2011 | Dimou et al. | 370/216 |

FOREIGN PATENT DOCUMENTS

| | | |
|---|---|---|
| JP | 10023501 A | 1/1998 |
| JP | 2001078242 A | 3/2001 |
| JP | 2003204335 A | 7/2003 |
| JP | 2003230169 A | 8/2003 |
| JP | 2005529567 A | 9/2005 |
| JP | 2007295318 A | 11/2007 |
| WO | WO9934633 | 7/1999 |
| WO | WO0230135 | 4/2002 |
| WO | WO03105520 | 12/2003 |
| WO | WO-2008131401 A1 | 10/2008 |
| WO | WO2010002926 | 1/2010 |

OTHER PUBLICATIONS

Huawei: "Mobility Robustness Optimisation," 3GPP Draft, R3-080754 3GPP TSG RAN WG3 Meeting #59bis, Mar. 26, 2008.

Huawei: "RLF Analysis," 3GPP TSG RAN WG2 Meeting #63, R2-084304, Aug. 12, 2008.

Huawei: "Solutions for the Mobility Robustness use case" 36PP Draft; R3-081165 Solutions for the Mobility Robustness Use Case, 3rd Generation Partnership Project (3GPP), Mobile Competence Centre ; 650, Route Des Lucioles ; F-06921 Sophia-Antipolis Cedex ; France, vol. RAN WG3, no. Kansas City, USA; 20080430, Apr. 30, 2008, XP050164358 [retrieved on Apr. 30, 2008] p. 2, paragraph 2 p. 2, paragraph 3.1-p. 5, paragraph 6.

Huawei: "Solutions for the Mobility Robustness Use Case," 3GPP Draft; R3-081165, May 9, 2008, 3rd Genaration Partnership Project (3GPP), Mobile Competence Centre.

International Search Report and Written Opinion—PCT/US2010/020276—International Search Authority—European Patent Office—May 25, 2010.

Qualcomm Europe et al: "Reporting Mechanisms for Too Early Ho" 3GPP TSG RAN WG3 #65 R-091538, Aug. 24, 2009.

Qualcomm Europe: "Support for Mobility Robustness Optimization Son Function" 3GPP TSG RAN WG3 Meeting #61bis; R3-091539, 3GPP, Aug. 24, 2009.

Samsung: "Use Case and Requirement for Mobility Robustness Optimisation," 3GPP TSG SA5#61, S5-082443, 3GPP Nov. 21, 2008.

Samsung: "Use Case and Requirement for Mobility Robustness Optimization" 3GPP Draft; S5-082106 vol. SA5 No Miami, US Nov. 21, 2008 3rd Generation Partnership Project (3GPP), Mobile Competence Centre; 650 Route Des Lucioles, F-06921 Sophia-Antipolis Cedex France, URL:/Http://WWW.3GPP.Org/FTP/TSG_SA/WG5_TM/TSGS5_62/DOCS/S5-082106.Zip Retrieved Apr. 20, 2010.

European Search Report—EP13150973—Search Authority—Munich—Mar. 5, 2013.

Qualcomm, "Performance Measurements for Handover Parameter Optimisation," 3GPP TSG-SA5 (Telecom Management) Meeting SA5#60, S5-081092, Sophia Antipolis, France, Jul. 7-8, 2008, 11 pages.

Taiwan Search Report—TW099100202—TIPO—May 9, 2014.

* cited by examiner

HANDOVER FAILURE MESSAGING SCHEMES

CLAIM OF PRIORITY

This application claims the benefit of and priority to commonly owned U.S. Provisional Patent Application No. 61/142,862, filed Jan. 6, 2009, U.S. Provisional Patent Application No. 61/158,993, filed Mar. 10, 2009, U.S. Provisional Patent Application No. 61/160,218, filed Mar. 13, 2009, U.S. Provisional Patent Application No. 61/158,988, filed Mar. 10, 2009, and U.S. Provisional Patent Application No. 61/160,222, filed Mar. 13, 2009, the disclosure of each of which is hereby incorporated by reference herein.

CROSS-REFERENCE TO RELATED APPLICATION

This application is related to concurrently filed and commonly owned U.S. patent application Ser. No. 12/651,755, entitled "ADAPTATION OF HANDOVER PARAMETERS," the disclosure of which is hereby incorporated by reference herein.

BACKGROUND

1. Field

This application relates generally to communication and more specifically, but not exclusively, to improving communication performance by adapting handover parameters.

2. Introduction

A wireless communication network is deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network. In general, at a given point in time, the access terminal will be served by a given one of these access points. As the access terminal roams throughout this geographical area, the access terminal may move away from its serving access point and move closer to another access point. In addition, signal conditions within a given cell may change, whereby an access terminal may be better served by another access point. In these cases, to maintain mobility for the access terminal, the access terminal may be handed-over from its serving access point to the other access point.

Preferably, handover occurs without any loss or disruption to the current communications path. In practice, however, various handover failures may occur. Such failures may include, for example, radio link failures (RLFs) and call drops. Some of these failures relate to handover parameters that may be manually configured or improperly controlled. When these parameters are not optimally configured, handover failures can occur. These failures may generally fall in to four main categories: 1) handovers that occur too early; 2) handovers that occur too late; 3) handovers that are not triggered properly; and 4) handovers that bounce back and forth between access points (which is sometimes referred to as "ping-ponging").

SUMMARY

A summary of sample aspects of the disclosure follows. In the discussion herein, any reference to the term aspects may refer to one or more aspects of the disclosure.

The disclosure relates in some aspects to handover parameter adaptation (e.g., optimization). In some aspects of the disclosure, different schemes are disclosed for facilitating a self-optimization function at access points in a system. Here, handover parameter settings are automatically adapted by the access points (e.g., without human intervention) to improve (e.g., maximize) handover performance in the system. For example, an access point may automatically detect incorrect or sub-optimal handover parameter settings by detecting handover-related failures and unnecessary handovers (e.g., ping-ponging). The access point may then adapt the handover parameter settings to reduce the number of handover-related failures and reduce inefficient use of network resources due to unnecessary handovers. In this way, degradation in user experience (e.g., call drops, RLFs, reduced data rates, and inefficient network resource utilization) caused by improper handover parameter settings may be reduced. Examples of handover parameters that may be adapted include time-to-trigger (TTT) parameters, offset parameters, and Cell Individual Offsets (CIO).

The disclosure relates in some aspects to reactive detection techniques for identifying different types of handover-related failures and adapting handover parameters based on this detection. For example, an access point may detect a handover-related failure that occurred as a result of a handover being performed too late and then adapt one or more handover parameters in an attempt to prevent such too late handovers. As another example, an access point may detect RLF that occurred as a result of a handover not being performed and then adapt one or more handover parameters in an attempt to prevent such RLFs. In addition, an access point may detect a handover-related failure that occurred as a result of a handover being performed too early and then adapt one or more handover parameters in an attempt to prevent such too early handovers. Also, an access point may detect a handover-related failure that occurred as a result of an access terminal being handed-over to the wrong cell and then adapt one or more handover parameters in an attempt to prevent such handovers to the wrong cell.

The disclosure relates in some aspects to messaging schemes for providing handover-related information to access points. For example, if an access point detects RLF that occurred at another access point, the access point may send an RLF report message to that other access point. In this way, the other access point may determine that its handover parameters need to be adjusted based on the RLF report. As another example, if an access point detects a failure (e.g., too early handover or a handover to a wrong cell) for a handover that originated at another access point, the access point may send a handover report message to that other access point. In this case, the other access point may determine that its handover parameters need to be adjusted based on the handover report.

The disclosure relates in some aspects to proactive detection techniques for identifying conditions that may lead to handover-related failures and then adapting handover parameters in an attempt to prevent such handover-related failures. For example, an access point may monitor the relative signal strengths (of itself and surrounding access points) as reported by one or more access terminals and determine, based on these signal strengths, whether too late handovers or too early handovers are likely to occur. If so, the access point may adjust one or more handover parameters to mitigate too late handovers or too early handovers.

The disclosure relates in some aspects to reducing ping-ponging by adapting handover parameters based on analysis of visited cell history maintained by access terminals in the system. For example, an access terminal may send its visited cell history to an access point when the access terminal is handed-over to that access point. The access point may then detect ping-ponging by analyzing the visited cell history (e.g., identifying the visited cells and the time spent at each cell). Upon detection of ping-ponging, the access point may adapt one or more handover parameters to reduce the likelihood of such ping-ponging in the future.

The disclosure relates in some aspects to configuring parameters (e.g., timer values) that are used to detect handover-related failures. For example, a network management system may configure parameters for access points in a system and send these parameters to the access points. The access points may then use the parameters to detect handover-related failures such as too early handovers and handovers to the wrong cell.

BRIEF DESCRIPTION OF THE DRAWINGS

These and other sample aspects of the disclosure will be described in the detailed description and the appended claims that follow, and in the accompanying drawings, wherein:

Figure 1:
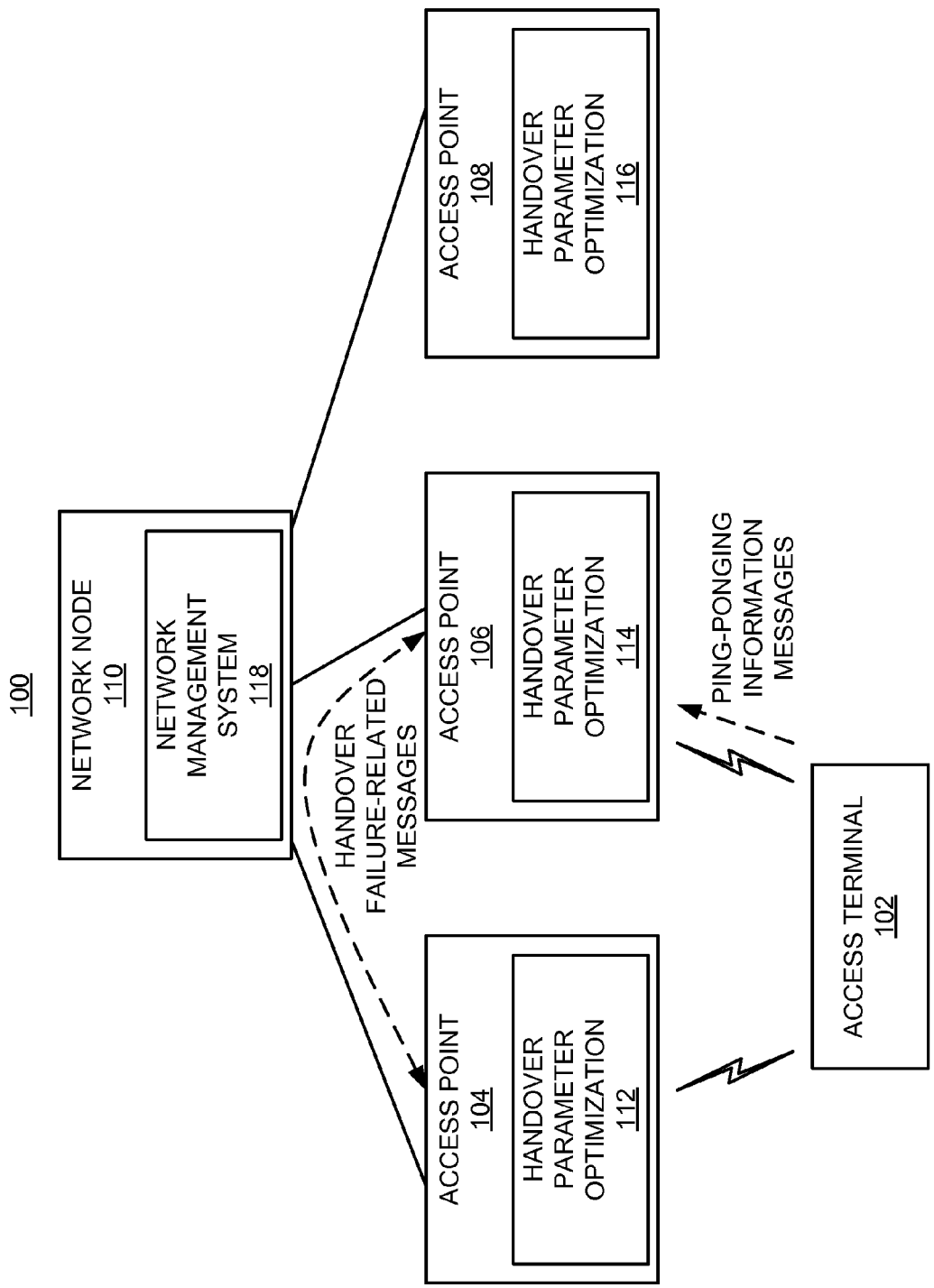
FIG. 1 is a simplified block diagram of several sample aspects of a communication system adapted to provide handover parameter optimization.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, eNodeBs, cells, and so on, while access terminals may be referred to or implemented as user equipment, mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or an access point 108. Each of the access points 104-108 may communicate with one or more network nodes (represented, for convenience, by network node 110) to facilitate wide area network connectivity. These network nodes may take various forms such as, for example, one or more radio and/or core network entities. Thus, in various implementations the network node 110 may represent functionality such as at least one of: network management (e.g., via an operation, administration, management, and provisioning entity), call control, session management, mobility management, gateway functions, interworking functions, or some other suitable network functionality.

In accordance with the teachings herein, the access points 104, 106, and 108 include handover parameter optimization components 112, 114, and 116, respectively, to provide self-optimization of one or more parameters used by the access points during handover operations. These handover parameters may include, for example, a time-to-trigger (TTT) parameter, an offset for a serving cell, a Cell Individual Offset (CIO), a hysteresis parameter for an event, and a cell re-selection parameter.

To provide self-optimization of such handover parameters, the access points may detect certain types of handover-related problems and then adapt one or more handover parameters in an appropriate manner in an attempt to prevent those types of handover-related problems from occurring in the future. For example, handover failures may occur as a result of too early handover triggering, too late handover triggering, handovers not being triggered, and handovers to the wrong cell. Here, handovers that are not triggered due to RLF occurring prior to handover triggering may be considered as a subset of too late handover triggering. In addition, system performance may be adversely affected if an access terminal is successively handed-over between access points (or cells) where the access terminal connects to each access point for only a relatively short period of time (ping-ponging). Thus, in some aspects, the description that follows relates to reducing the occurrences of too late handovers, too early handovers, handovers to the wrong cell, and ping-ponging.

To facilitate detection of these handover-related problems, the access points may receive handover-related messages (e.g., as indicated by the dashed lines in FIG. 1) from other nodes in the system 100. As discussed in more detail below, these messages may comprise, for example, handover failure-related messages such as RLF report messages (e.g., RLF indication messages or RLF event reports) and handover report messages (e.g., handover event reports), and ping-ponging information messages such as messages including access terminal history information. Upon receiving one of these handover-related messages, an access point may identify one of these above types of handover-related problems and then adapt an appropriate handover parameter in an attempt to mitigate this particular type of handover problem.

In some cases, an access point will use one or more parameters for detecting a handover-related failure. For example, an access point may employ a timer to determine whether an RLF occurred within a defined period of time after an access terminal was handed-over. To facilitate effective detection of such events, a network management system 118 may configure these parameters and then send these parameters to the access points in the system 100.

With the above overview in mind, various techniques that may be employed to adapt handover parameters in accordance with the teachings herein will be described with reference to FIGS. 2-17. For illustration purposes, the operations of the flowcharts of FIGS. 5-12 and 14-17 (or any other operations discussed or taught herein) may be described as being performed by specific components (e.g., components shown in FIGS. 1-4 or FIG. 18). It should be appreciated, however, that these operations may be performed by other types of components and may be performed using a different number of components. It also should be appreciated that one or more of the operations described herein may not be employed in a given implementation.

Figure 2:
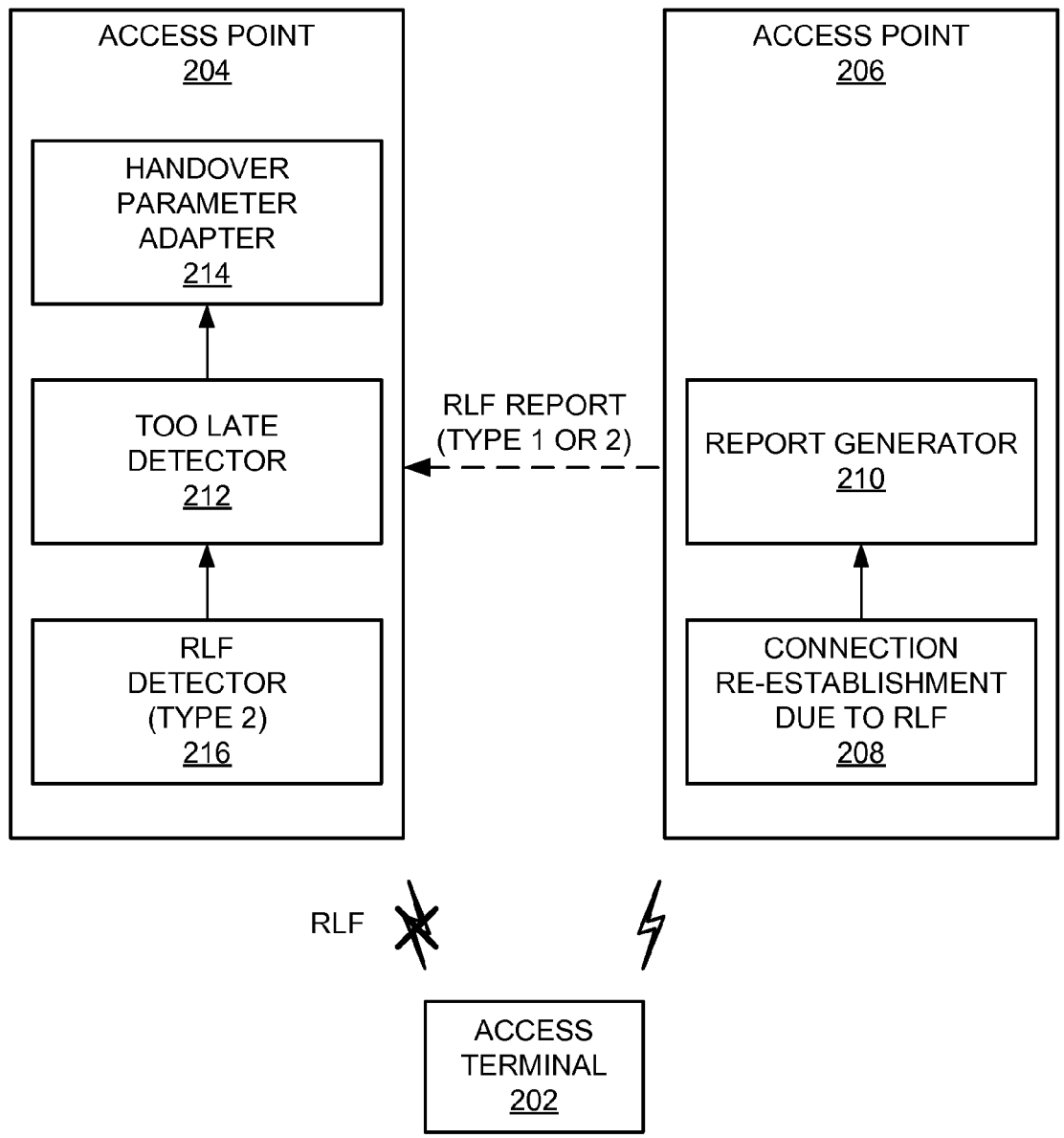
FIG. 2 is a simplified block diagram of several sample aspects of a communication system adapted to detect a too late handover failure and, in response, adapt handover parameters to mitigate too late handover failures.
Figure 3:
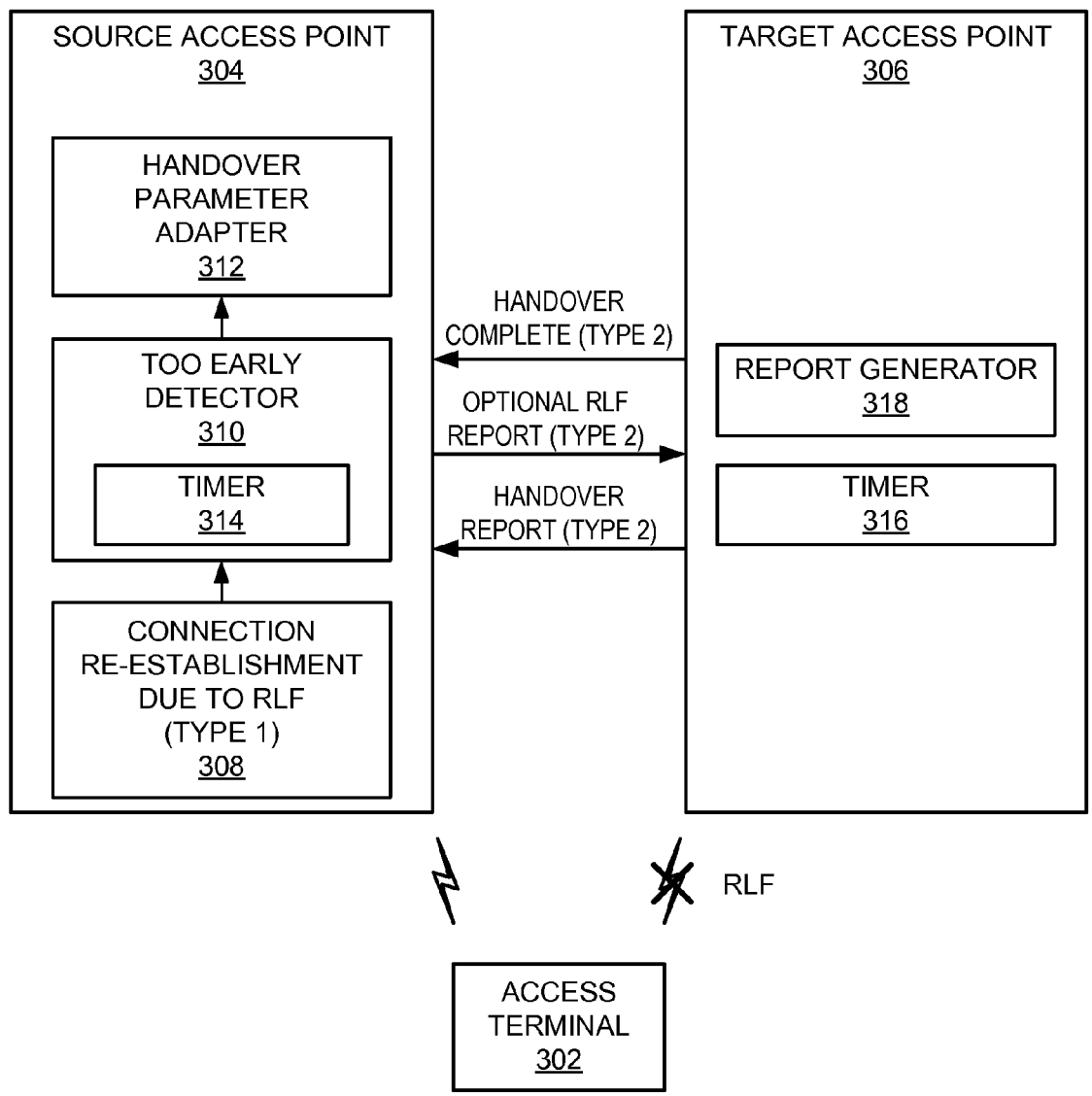
FIG. 3 is a simplified block diagram of several sample aspects of a communication system adapted to detect a too early handover failure and, in response, adapt handover parameters to mitigate too early handover failures.
Figure 4:
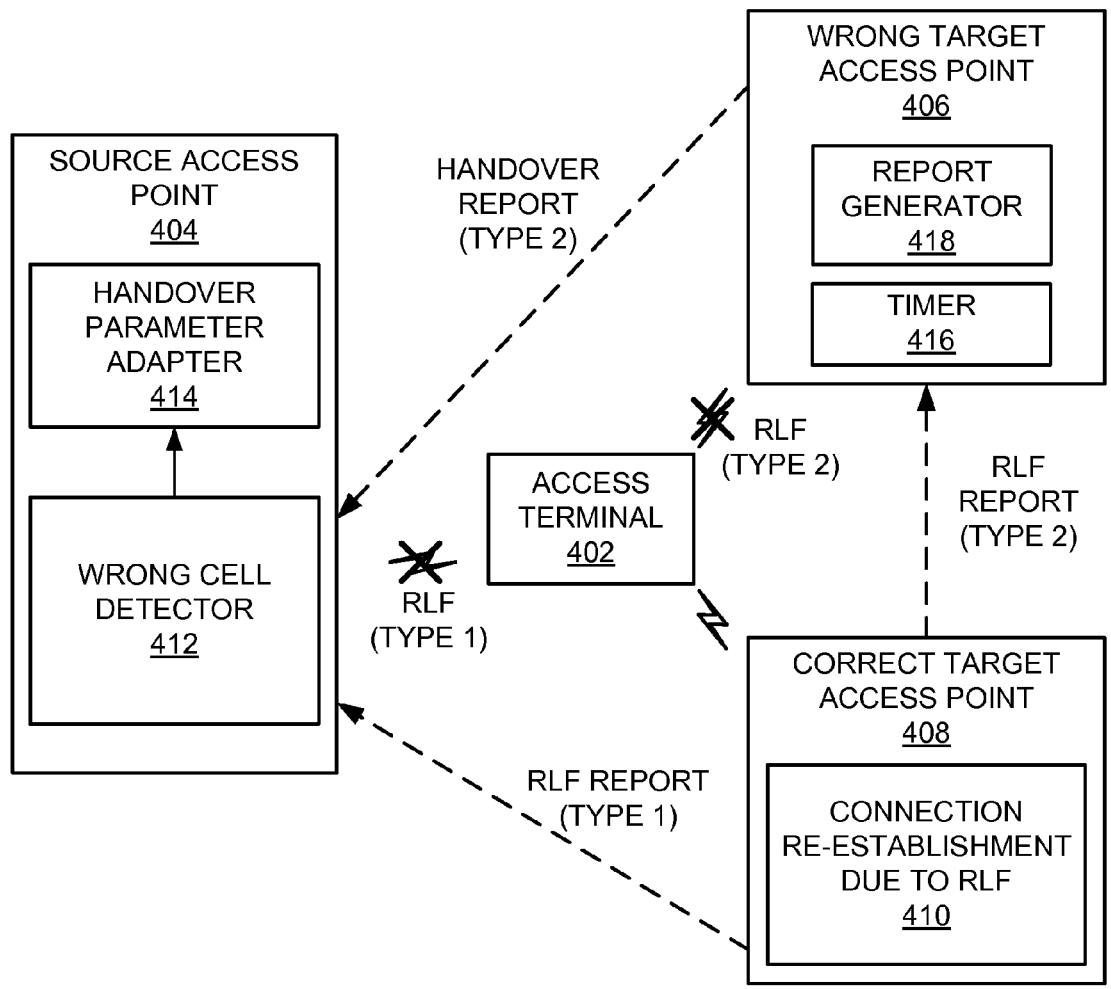
FIG. 4 is a simplified block diagram of several sample aspects of a communication system adapted to detect handover to the wrong cell and, in response, adapt handover parameters to mitigate handovers to the wrong cell.

FIGS. 2-4 illustrate messaging that may be employed to detect a handover-related failure. FIG. 2 illustrates messaging that may be employed to facilitate detection of a too late handover. FIG. 3 illustrates messaging that may be employed to facilitate detection of a too early handover. FIG. 4 illustrates messaging that may be employed to facilitate detection of a handover to the wrong cell.

Referring initially to the detection of too late handovers, if access terminal mobility is more aggressive than what the handover parameter settings allow for, handover may be triggered when the signal strength of the source is already too low—leading to RLF. Moreover, handover may not be triggered at all if an RLF preempts handover. These scenarios may be common in areas with high user mobility (e.g., along a highway, on a high speed train, etc.)

In FIG. 2, an access terminal 202 is in the vicinity of an access point 204 and an access point 206. Initially, the access terminal 202 is connected to the access point 204 (e.g., a cell of the access point 204). Here, RLF may occur as a result of inadequate configuration of handover triggering parameters at the access point 204 (e.g., as discussed above). In the event the signal quality provided by the access point 206 is sufficient to maintain a call for the access terminal 202, the access terminal 202 may re-establish the connection at the access point 206 (e.g., at a cell of the access point 206).

In one sample implementation, there are two types of too late handovers. In a first type of too late handover, RLF occurs before the access point 204 receives a handover-triggering measurement report message from the access terminal 202. Thus, in this case, RLF occurs before any handover operations have commenced. In a second type of too late handover, RLF occurs after the access point 204 receives a handover-triggering measurement report message from the access terminal 202, but before the access terminal 202 receives a handover command from the access point 204. Thus, in this case, the access point 204 has commenced handover operations, however, RLF occurs before the handover operations are completed.

Referring initially to the first type of too late handover, if the access terminal 202 re-establishes the connection at the access point 206 after RLF at the access point 204, the access point 206 reports this RLF event to the access point 204 via an RLF report message (as represented by the dashed line in FIG. 2). In other words, if the access terminal 202 re-establishes (or attempts to re-establish) the radio link at the access point 206 after RLF at the access point 204, the access point 206 reports this RLF event to the access point 204. Here, the access point 206 may use an identifier (e.g., physical cell identifier, PCI) provided by the access terminal during connection re-establishment to identify the previous serving cell/access point (or possible candidates in the case of identifier confusion) for the access terminal. The access point 204 may then detect a too late handover based on this RLF report message. For example, the access point 204 may match the correct context (based on an access terminal identifier included in the RLF report message), and analyze the possible root cause of the RLF which preceded the re-establishment request.

The above operations are represented by corresponding functional blocks in FIG. 2. Here, a component 208 of the access point 206 detects the re-establishment of the connection by the access terminal 202 due to RLF. As a result of this connection re-establishment, a report generator 210 sends the RLF report message to the access point 204. Upon receiving this message, a too late detector 212 determines that the access terminal 202 was not handed-over to the access point 206 soon enough. That is, a too late handover is detected. Consequently, a handover parameter adapter 214 may adapt one or more handover parameters based on the detection of the too late handover. As will be discussed in more detail below, the adaptation of handover parameters may be based on the detection of one or more too late handovers (e.g., associated with the same cell or access point or different cells or access points).

The RLF report message may include various types of information to enable the access point 204 to determine that the access terminal 202 was not handed-over soon enough to the access point 206. For example, the RLF report may include at least one of: an identifier of the access terminal, an identifier of the cell and/or an identifier of the access point at which the RLF occurred, an identifier of the cell and/or an identifier of the access point at which the access terminal attempted connection re-establishment, a geographical location of the RLF, the time when the RLF occurred, the type of the report (e.g., too late handover), a frequency band on which the RLF occurred, a frequency band on which the access terminal reconnected, or other information of interest for handover parameter optimization. The above identifiers may comprise, for example, physical cell identifiers (PCIs), cell global identifiers (CGIs), MAC identifiers (e.g., a short MAC address), RNTIs for the access terminal, or some other suitable identifier(s).

RLF events may be reported in various ways. In some implementations RLF events are reported using event-based reporting. For example, an RLF event may be reported each time an RLF event occurs. In some implementations RLF events are reported periodically. Here, the reporting interval may be configurable (e.g., by a network management system). In some implementations RLF events are reported using request-based reporting (e.g., polling). For example, an access point may send an RLF report in response to a request from another access point. In some implementations RLF events are reported using policy-based event reporting. For example, RLF events may be reported based on configurable policy provided by a network operator (e.g., via an operations, administration, and management (also referred to as an operations, administration, and maintenance (OAM) system).

In the example of FIG. 2, the RLF report is sent between access points (i.e., externally to an access point). Here, the RLF report may be sent over external access point interfaces using standardized protocols. For example, in an LTE-based system, the report may be sent over an X2 interface using X2-AP protocol (specified in 3GPP TS 36.423) and/or over an S1 interface using S1-AP protocol (specified in 3GPP TS 36.413).

In other cases, a cell sending an RLF event report and a cell to which the RLF event report is sent may be parented by the same access point. In these cases, the RLF event report may be sent internally to an access point (e.g., by operation of internal software of the access point).

Referring now to the second type of too late handover, in the course of regular connected mode measurements while at the access point 204, the access terminal 202 detects a candidate access point (access point 206) that fulfills the criteria for sending a measurement report message (e.g., requesting handover). In this case, the access terminal 202 successfully sends a measurement report message to the access point 204. The access point 204 then executes a handover preparation procedure (e.g., pursuant to TS 36.413 and 36.423 in an LTE-based system). Thus, the access point 204 attempts to send a handover command to the access terminal 202 requesting handover to the access point 206. However, the access terminal 202 experiences RLF at the access point 204 before it is able to receive the handover command or before it is able to successfully act on the handover command (e.g., connect to the access point 206).

In this case, the access point 204 may autonomously detect the too late handover and/or the access point 204 may detect the too late handover based on an RLF report message received from the access point 206 (e.g., in a similar manner as described above for type 1 too late handover detection). In the former case, an RLF detector component 216 may detect the RLF by the access terminal 202. For example, the access point 204 may determine that the RLF occurred while the access point 204 was attempting to transmit the handover command to the access terminal 202. In some aspects, the access point 204 may detect the RLF based on loss of lower-level synchronization with the access terminal 202.

Referring now to FIG. 3, sample messaging that may be employed in conjunction with detection of too early handovers will be described. In some aspects, a too early handover may be triggered when the access terminal enters an unintended island of coverage of another cell contained inside the coverage area of a serving cell. This is a typical scenario for areas where fragmented cell coverage is inherent to the radio propagation environment, such as in dense urban areas. A signature of the too early handover is RLF in the target cell during handover followed by connection re-establishment in the source cell.

In FIG. 3, an access terminal 302 is the vicinity of an access point 304 and an access point 306 as above. The access terminal 302 is initially connected to the access point 304 (e.g., a cell of the access point 304) and is then handed-over to the access point 306 (e.g., a cell of the access point 306). However, RLF occurs at the access point 306 during handover or soon after handover is completed as a result of inadequate configuration of handover triggering parameters at the access point 304. That is, due to these incorrect handover parameter settings, the access terminal 302 was handed-over to the access point 306 too soon (e.g., before the adequacy of the signal quality provided by the access point 306 for the access terminal 302 could be established). As a result of this RLF, the access terminal 302 re-establishes the connection at the access point 304 (e.g., at a cell of the access point 304).

In one sample implementation, there are two types of too early handovers. In a first type of too early handover, RLF occurs before the access terminal 302 successfully connects (e.g., transmits a handover confirm message) to the access point 306. In a second type of too late handover, RLF occurs a short time after the access terminal 302 successfully connects to the access point 306.

The access point 304 may autonomously detect the first type of too early handover. These operations are represented by corresponding functional blocks in FIG. 3. Here, a component 308 of the access point 304 detects the re-establishment of the connection by the access terminal 302 due to RLF. As a result of this connection re-establishment, a too early detector 310 determines that the access terminal 302 was handed-over to the access point 306 too soon. That is, a too early handover is detected. Consequently, a handover parameter adapter 312 may adapt one or more handover parameters based on the detection of the too early handover. As will be discussed in more detail below, the adaptation of handover parameters may be based on the detection of one or more too early handovers (e.g., associated with the same cell or access point or different cells or access points).

Referring now to the second type of too early handover, the source and/or the target for the handover may employ a timer to detect this type of too early handover. For example, the source may detect a too early handover based on whether an access terminal that was handed-over re-establishes a connection at the source within a defined period of time after the handover was completed. Similarly, the target may detect a too early handover based on whether an RLF report concerning the access terminal's RLF at the target is received at the target within a defined period of time after the handover was completed. These detection mechanisms will be discussed in turn with reference to FIG. 3.

The access point 304 may start a timer 314 ($t_{early\_HO\_source}$) when the access point 304 is informed that the handover from the access point 304 to the access point 306 was completed. For example, completion of the handover may be indicated when the access point 304 receives a user equipment (UE) context release message from the access point 306. If the access terminal 302 re-establishes the connection at the access point 304 after RLF at the access point 306 before the timer 314 expires, the too early detector 310 detects a too early handover. The handover parameter adapter 312 may then adapt one or more handover parameters based on the detection of the too early handover.

In some cases, the source may elect to not report the RLF event to the target. However, in other cases (e.g., in implementations where the source does not employ a timer and/or has deleted the UE context as a result of the UE context release message), the source may send an RLF report message to the target since the RLF event may appear to the source to be a too late handover event for the target.

In this case, with reference to FIG. 3, the access point 306 may start a timer 316 ($t_{early\_HO\_target}$) when an incoming handover from the access point 304 is completed. For example, completion of the handover may be indicated by the access point 306 sending a UE context release message to the access point 304. If an RLF report is received from the access point 304 for the access terminal 302 before the timer 316 expires, the access point 306 determines that this report indicates that the access terminal 302 was handed-over by the access point 304 too early. In other words, the access point 306 determines that this report is not indicative of a too late handover by the access point 306. Consequently, the access point 306 may not act on the RLF report, a report generator 318 of the access point 306 may send a handover report message to the access point 304 to inform the access point 304 of the too early handover, or both actions may be taken.

Thus, the access point 306 may return an indication of a too early handover event to the access point 304 when the access point 306 receives an RLF report from the access point 304 and if the access point 306 has sent the UE context release message to the access point 304 related to the completion of an incoming handover for the same access terminal within the defined period of time ($t_{early\_HO\_target}$). Upon receiving this message, the too early detector 310 determines that the access terminal 302 was handed-over to the access point 306 too soon. That is, a too early handover is detected. Consequently, the handover parameter adapter 312 may adapt one or more handover parameters based on the detection of the too early handover.

The handover report message may include various types of information to enable the access point 304 to determine that the access terminal 302 was handed-over to the access point 306 too early. For example, the handover report may include at least one of: an identifier of the access terminal, an identifier of the target (e.g., an identifier of the cell and/or an identifier of the access point at which the RLF occurred), an identifier of the source (e.g., an identifier of the cell and/or an identifier of the access point at which the access terminal attempted connection re-establishment), the type of detected handover problem (e.g., too early handover), a handover cause (e.g., signaled by the source during handover preparation), or other information of interest for handover parameter optimization. The above identifiers may comprise, for example, physical cell identifiers (PCIs), cell global identifiers (CGIs), MAC identifiers (e.g., a short MAC address), RNTIs for the access terminal, or some other suitable identifier(s).

Handover reports may be reported in various ways. In some implementations handover reports are reported using event-based reporting. For example, a handover report may be reported each time a corresponding event occurs. In some implementations handover reports are reported periodically. Here, the reporting interval may be configurable (e.g., by a network management system). In some implementations handover reports are reported using request-based reporting (e.g., polling). For example, an access point may send a handover report in response to a request from other access point. In some implementations handover reports are reported using policy-based event reporting. For example, a handover report may be reported based on configurable policy provided by a network operator (e.g., via an operations, administration, and management (also referred to as an operations, administration, and maintenance (OAM)) system).

In the example of FIG. 3, the handover report is sent between access points (i.e., externally to an access point). Here, the handover report may be sent over external access point interfaces using standardized protocols. For example, in an LTE-based system, the report may be sent over an X2 interface using X2-AP protocol (specified in 3GPP TS 36.423) and/or over an S1 interface using S1-AP protocol (specified in 3GPP TS 36.413).

In other cases, a cell sending a handover report and a cell to which the handover report is sent may be parented by the same access point. In these cases, the handover report may be sent internally to an access point (e.g., by operation of internal software of the access point).

Referring now to FIG. 4, sample messaging that may be employed in conjunction with detection of handovers to the wrong cell will be described. In some aspects, handovers may be directed towards a wrong cell if handover parameters are set incorrectly. An example of a signature of a handover to a wrong cell is an RLF during handover followed by connection re-establishment in a cell other than the source cell or the target cell. For purposes of illustration, the following discussion will describe handover between cells. It should be appreciated, however, that the disclosed concepts are applicable to handover between access points as well.

In one sample implementation, there are two types of handovers to the wrong cell. In a first type of handover to the wrong cell, RLF occurs in the source cell before the access terminal successfully connects (e.g., transmits a handover confirm message) to the target cell. In a second type of handover to the wrong cell, RLF occurs a short time after the access terminal successfully connects to the target cell.

Referring initially to the first type of handover, with reference to FIG. 4, at some point in time the handover of an access terminal 402 has been initiated from a source cell (e.g. access point 404). For example, the access terminal 402 may have received a handover command message from the source cell. However, RLF occurs at the source cell before the access terminal 402 is able to connect to the target cell (e.g. access point 406). In some implementations, connection refers to successful transmission of a handover confirm message. As a result of the RLF, the access terminal 402 re-establishes the connection at a third cell (e.g. access point 408) that is not the source cell or the target cell.

Upon detecting the re-establishment of the connection by the access terminal 402 due to RLF (e.g., by a component 410 of the access point 408), the third cell sends an RLF report message (e.g., as discussed herein) to the source cell. Upon receiving this message, the source cell (e.g., a wrong cell detector 412) determines that the access terminal 402 was handed-over to the wrong cell (e.g., the access terminal 402 was handed-over to a cell that provided lower signal quality than the third cell). That is, a handover to the wrong cell is detected. Consequently, a handover parameter adapter 414 may adapt one or more handover parameters based on the detection of the handover to the wrong cell. As discussed herein, the adaptation of handover parameters may be based on the detection of one or more handovers to the wrong cell (e.g., associated with the same cell or access point or different cells or access points).

Referring now to the second type of handover to the wrong cell, the target may detect a handover to the wrong cell based on whether an RLF report concerning the access terminal's RLF at the target is received at the target within a defined period of time after the handover was completed. In some aspects, a signature of a handover to the wrong cell may involve: 1) handover has been initiated from the source cell; 2) the access terminal connected to the target cell; 3) RLF occurred in the target cell; and 4) the access terminal reconnected in a third cell that is not the source cell or the target cell.

Referring to FIG. 4, the target cell may start a timer 416 ($t_{store\_UE\_context}$) when an incoming handover from the access point 404 is completed. For example, completion of the handover may be indicated by the access point 406 sending a UE context release message to the access point 404. If the target cell receives an RLF report for the access terminal 402 before the timer 416 pertaining to that access terminal expires, the target cell will take appropriate action depending upon which cell sent the RLF report. If the RLF report was received from the source cell (e.g., from the access point 404) the target cell may elect to not act upon the RLF report as discussed herein. If, on the other hand, the RLF report was received from a cell (e.g., from the access point 408) other than the source cell, the target cell (e.g., a report generator 418) may send a handover report message (e.g., as described herein) to the source cell to inform the source cell of the handover to the wrong cell.

Thus, in this latter case, the target cell (e.g., access point 406) may send a handover report message indicating a handover to a wrong cell event to the source cell (e.g., access point 404) when the target cell receives an RLF indication from the third cell (e.g., access point 408), and if the target cell has sent the UE context release message to the source cell related to the completion of an incoming handover for the same access terminal within a defined period of time (e.g., $t_{store\_UE\_context}$ seconds).

Upon receiving this message, the wrong cell detector 412 determines that the access terminal 402 was handed-over to the wrong cell. That is, handover to the wrong cell is detected. Consequently, the handover parameter adapter 414 may adapt one or more handover parameters based on the detection of the handover to the wrong cell.

The handover report message may include similar information as discussed above. In this case, however, the type of detected handover problem that is indicated by the report will be a handover the wrong cell. In addition, the report may include an identifier of the wrong target (e.g., an identifier of the cell and/or an identifier of the access point at which the RLF occurred), an identifier of a correct target (e.g., an identifier of the cell and/or an identifier of the access point at which the access terminal attempted connection re-establishment), and an identifier of the source (e.g., an identifier of the cell and/or an identifier of the access point that initiated the handover).

FIGS. 5-11B describe sample operations (e.g., algorithms) that may be employed for reactive detection. In some aspects, reactive detection is aimed at preventing future occurrences from happening based on received reports and analysis of past occurrences. For purposes of illustration, the following describes operations of cells and messaging between cells. It should be appreciated that these operations also may correspond generally to operations of access points and messaging between access points.

Figure 5:
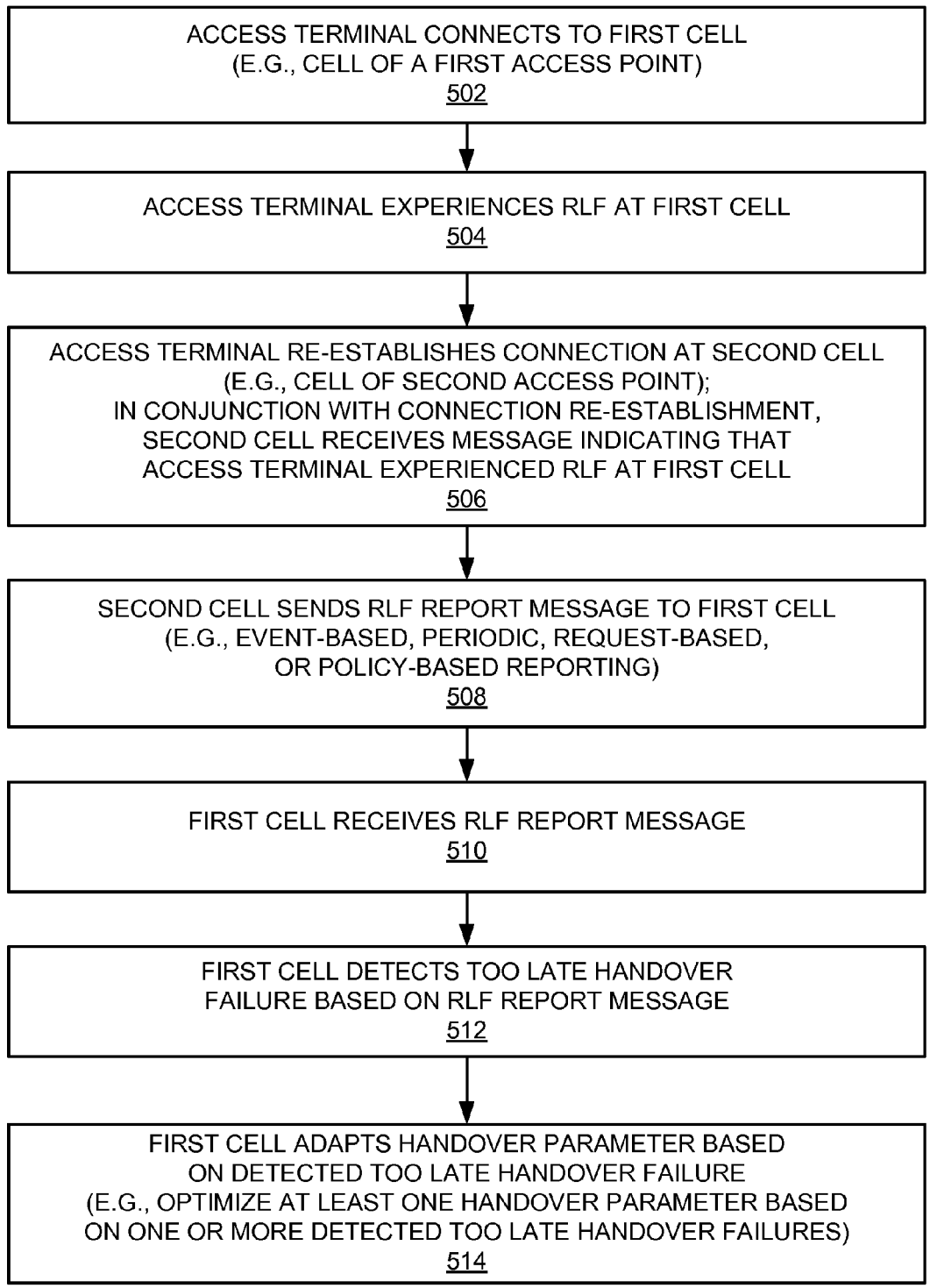
FIG. 5 is a flowchart of several sample aspects of operations that may be performed to detect a first type of too late handover (e.g., a failure to handover) and, in response, adapt handover parameters to mitigate too late handover failures.
Figure 6:
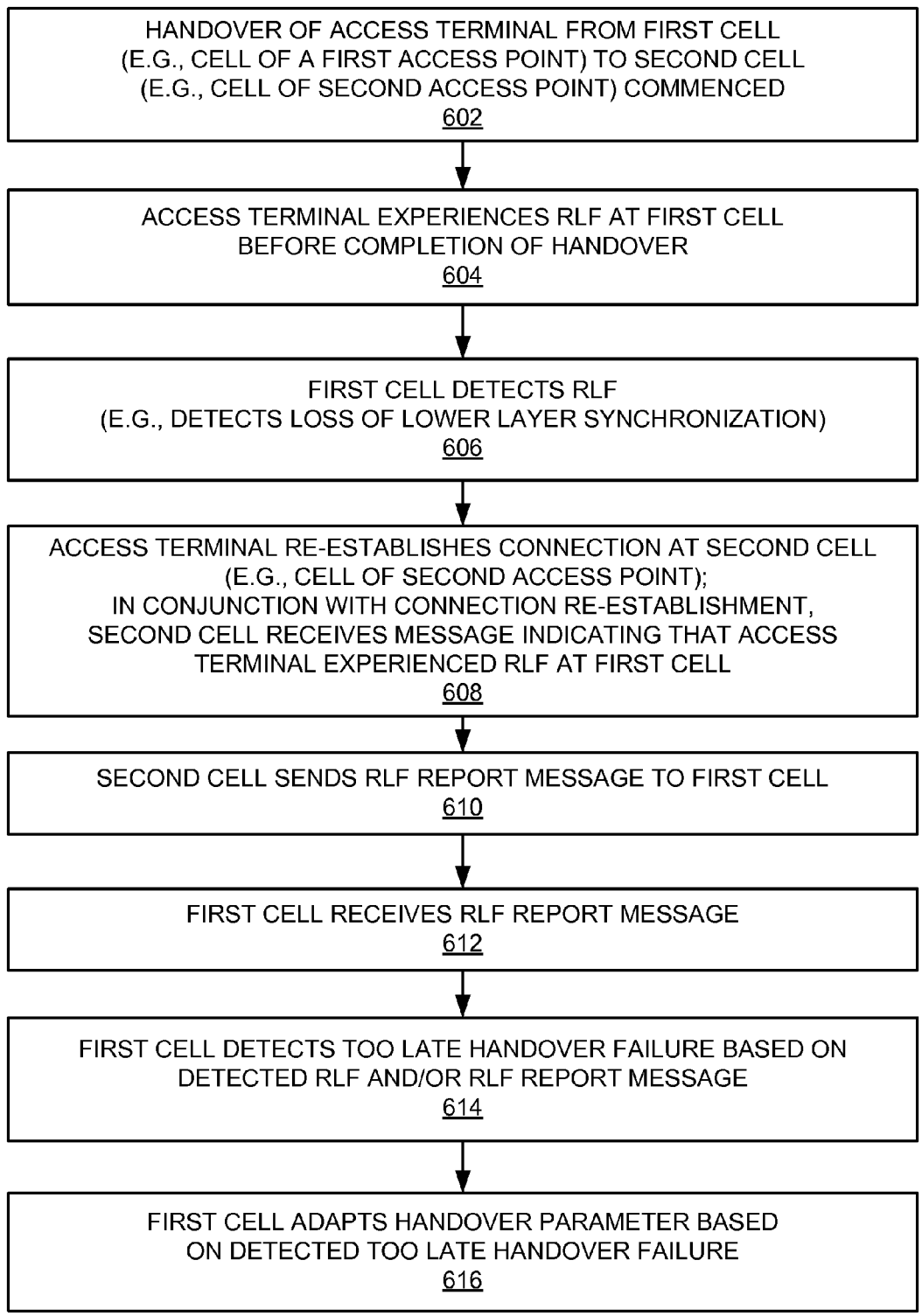
FIG. 6 is a flowchart of several sample aspects of operations that may be performed to detect a second type of too late handover failure and, in response, adapt handover parameters to mitigate too late handover failures.

The flowcharts of FIGS. 5 and 6 describe operations that may be employed to provide handover parameter adaptation based on detection of too late handover. Specifically, FIG. 5 relates to the first type of too late handover as discussed herein and FIG. 6 relates to the second type of too late handover as discussed herein.

As represented by block 502 of FIG. 5, at some point in time an access terminal connects to a first cell (e.g., a first access point). While connected to the first cell, the access terminal may detect a candidate cell (a second cell) that fulfills the criteria for sending a measurement report message to the first cell. Consequently, the access terminal may attempt to send a measurement report message to the first cell.

As represented by block 504, however, the access terminal experiences RLF at the first cell while attempting to send (or prior to sending) the measurement report message. As discussed herein, the RLF may have occurred as a result of inadequate configuration of handover triggering parameters at the first cell (e.g., first access point) that caused the access terminal to not be handed-over.

As represented by block 506, the access terminal re-establishes the connection at the second cell. Here, the access terminal selects the access point of the second cell for re-establishing the connection after the RLF (e.g., based on received signal strengths of access points detected by the access terminal). As discussed herein, in conjunction with the re-establishment of the connection, the second cell (e.g., second access point) receives a message from the access terminal that indicates that the access terminal experienced RLF at the first cell (e.g., a first access point). Here, the message identifies the cell (and/or access point) at which the RLF occurred.

As represented by block 508, the second cell (e.g., second access point) sends an RLF report message for this access terminal to the first cell. In some aspects, this message informs the first cell (e.g., first access point) of the connection re-establishment. As discussed herein, this message may comprise, for example, an identifier of a cell at which the RLF occurred, an identifier of a cell at which the connection was re-established, and an identifier of the access terminal. Also as discussed above, this report message may be sent according to event-based, periodic, request based, policy-based reporting, or some other suitable reporting scheme. The first cell receives this report message as represented by block 510.

As represented by block 512, the first cell detects too late handover failure based on the received RLF report message. For example, the first cell may analyze the information in the report and conclude that this relates to the case of a too late handover from the first cell to the second cell. Thus, in some aspects, the detection of block 512 may comprise detecting RLF due to too late handover. In some aspects, the detection may comprise determining at a first cell (or access point) that RLF occurred prior to handover of the access terminal from the first cell to a second cell (or access point). In some aspects, the detection may comprise receiving a message from a second cell (or access point) at a first cell (or access point), wherein the message indicates that an access terminal re-establishing a connection at the second cell experienced RLF at the first cell, and determining that the access terminal was not handed-over to the second cell soon enough based on the received message.

As represented by block 514, the first cell adapts one or more handover parameters based on the detection of too late handover failure. For example, the first cell may take the received information into consideration for the purpose of optimization of handover parameters to avoid too late handovers to the second cell in the future.

The adaptation of handover parameters as taught herein may take into account one or more handover failure events. For example, a handover parameter may be adapted for a specific cell based on detected too late handovers associated with that cell and/or some other cell(s). Alternatively, a handover parameter may be adapted for a set of cells based on detected too late handovers failures associated with those cells and/or some other cell(s).

Various types of handover parameters may be adapted here. For example, at least one of: a time-to-trigger (TTT) parameter, an offset for a serving cell, a Cell Individual Offset (CIO), or a hysteresis parameter for an event, may be adapted (e.g., reduced) to reduce the likelihood that too late handovers will occur in the future.

Referring to the type 2 too late handover of FIG. 6, while connected to the first cell, the access terminal may detect a candidate cell (a second cell) that fulfills the criteria for sending a measurement report message to the first cell. In this case, the access terminal successfully sends the measurement report message to the first cell. Accordingly, handover of the access terminal to the second cell may be commenced as represented by block 602. Here, the first cell attempts to send a handover command to the access terminal requesting handover to the second cell.

As represented by block 604, however, the access terminal experiences RLF at the second cell before the access terminal is able to receive the handover command or before the access terminal is able to successfully act on the handover command (e.g., successfully connect to the second cell). As discussed herein, the RLF may have occurred as a result of inadequate configuration of handover triggering parameters at the first cell (e.g., first access point) that caused the handover from the first cell (e.g., first access point) to the second cell (e.g., second access point) to be triggered too late for successful handover.

As represented by block 606, the first cell detects the RLF of the access terminal. For example, the first cell may detect the RLF while trying to transmit the handover command and conclude that this is a case of a too late handover from the first cell to the second cell. As discussed herein, in some cases detection of RLF may involve detecting the loss of lower layer synchronization with an access terminal during an ongoing procedure of handing-over the access terminal from a first cell (or access point) to a second cell (or access point). Thus, in some aspects, the detection of block 606 may comprise detecting RLF due to too late handover, wherein the detection may comprise determining at a first cell (or access point) that RLF occurred during handover of the access terminal from the first cell to a second cell (or access point).

As represented by block 608, the access terminal re-establishes the connection at the second cell. As discussed herein, in conjunction with the re-establishment of the connection, the second cell receives a message from the access terminal that indicates that the access terminal experienced RLF at the first cell.

As represented by block 610, the second cell sends an RLF report message for this access terminal to the first cell. As discussed above, this report message may be sent according to any suitable reporting scheme. The first cell receives this report message as represented by block 612.

As represented by block 614, the first cell detects too late handover failure based on the received RLF report message. For example, the first cell may analyze the information in the report and conclude that this relates to the case of a too late handover from the first cell to the second cell. Thus, in some aspects, the detection of block 614 may comprise detecting RLF due to too late handover. Here, the detection may comprise receiving a message from a second cell (or access point) at a first cell (or access point), wherein the message indicates that an access terminal re-establishing a connection at the second cell experienced RLF at the first cell, and determining that the access terminal was not handed-over to the second cell soon enough based on the received message. In addition, in some aspects, the determination that the access terminal was not handed-over to the second cell soon enough may comprise determining that the access terminal experienced the RLF during handover of the access terminal from the first cell to a second cell.

As represented by block 616, the first cell adapts one or more handover parameters based on the detected too late handover failure. For example, the first cell may take the received information into consideration for the purpose of optimization of handover parameters to avoid too late handovers to the second cell in the future.

Figure 7:
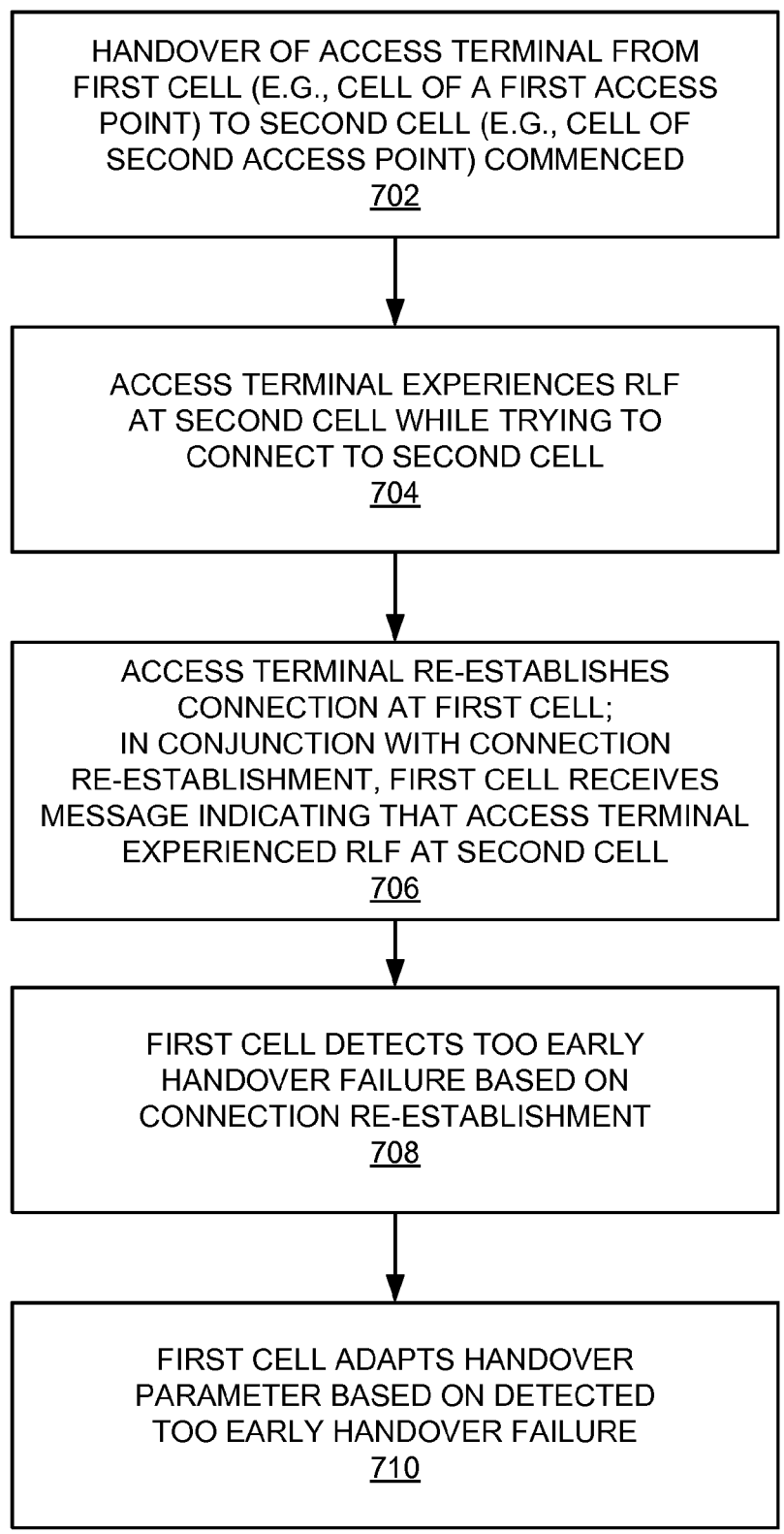
FIG. 7 is a flowchart of several sample aspects of operations that may be performed to detect a first type of too early handover failure and, in response, adapt handover parameters to mitigate too early handover failures.

The flowcharts of FIGS. 7-9B describe operations that may be employed to provide handover parameter adaptation based on detection of too early handover. FIG. 7 relates to the first type of too early handover as discussed herein and FIGS. 8-9B relate to the second type of too early handover as discussed herein.

Referring to FIG. 7, while connected to the first cell, handover of the access terminal to the second cell is commenced as represented by block 702. In this example, the first cell successfully transmits a handover command to the access terminal requesting handover to the second cell.

As represented by block 704, the access terminal experiences RLF at the second cell while attempting to connect to the second cell. As discussed herein, the RLF may have occurred as a result of inadequate configuration of handover triggering parameters at the first cell (e.g., first access point) that caused the handover from the first cell (e.g., first access point) to the second cell (e.g., second access point) to be triggered too early for successful handover.

As represented by block 706, the access terminal re-establishes the connection at the first cell. As discussed herein, in conjunction with the re-establishment of the connection, the first cell receives a message from the access terminal that indicates that the access terminal experienced RLF at the second cell.

As represented by block 708, the first cell detects too early handover failure based on the connection re-establishment. For example, upon detecting connection re-establishment by the access terminal after an outgoing handover attempt to another cell, the first cell may conclude that this is the case of a type 1 too early handover. Thus, in some aspects, the detection of block 708 may comprise detecting RLF due to too early handover, wherein the detection may comprise determining at a first cell (or access point) that an access terminal that re-established a connection at the first cell experienced RLF at a second cell (or access point) due to a prematurely initiated handover of the access terminal from the first cell to the second cell.

As represented by block 710, the first cell adapts one or more handover parameters based on the detection of too early handover failure. For example, the first cell may take the received information into consideration for the purpose of optimization of handover parameters to avoid too early handovers to the second cell in the future. As discussed herein, this may involve, for example, adapting (e.g., increasing) at least one of: a time-to-trigger (TTT) parameter, an offset for a serving cell, a Cell Individual Offset (CIO), or a hysteresis parameter for an event.

The adaptation of handover parameters as taught herein may take into account one or more handover failure events. For example, a handover parameter may be adapted for a specific cell based on detected too early handovers associated with that cell and/or some other cell(s). Alternatively, a handover parameter may be adapted for a set of cells based on detected too early handovers failures associated with those cells and/or some other cell(s).

Figure 8:
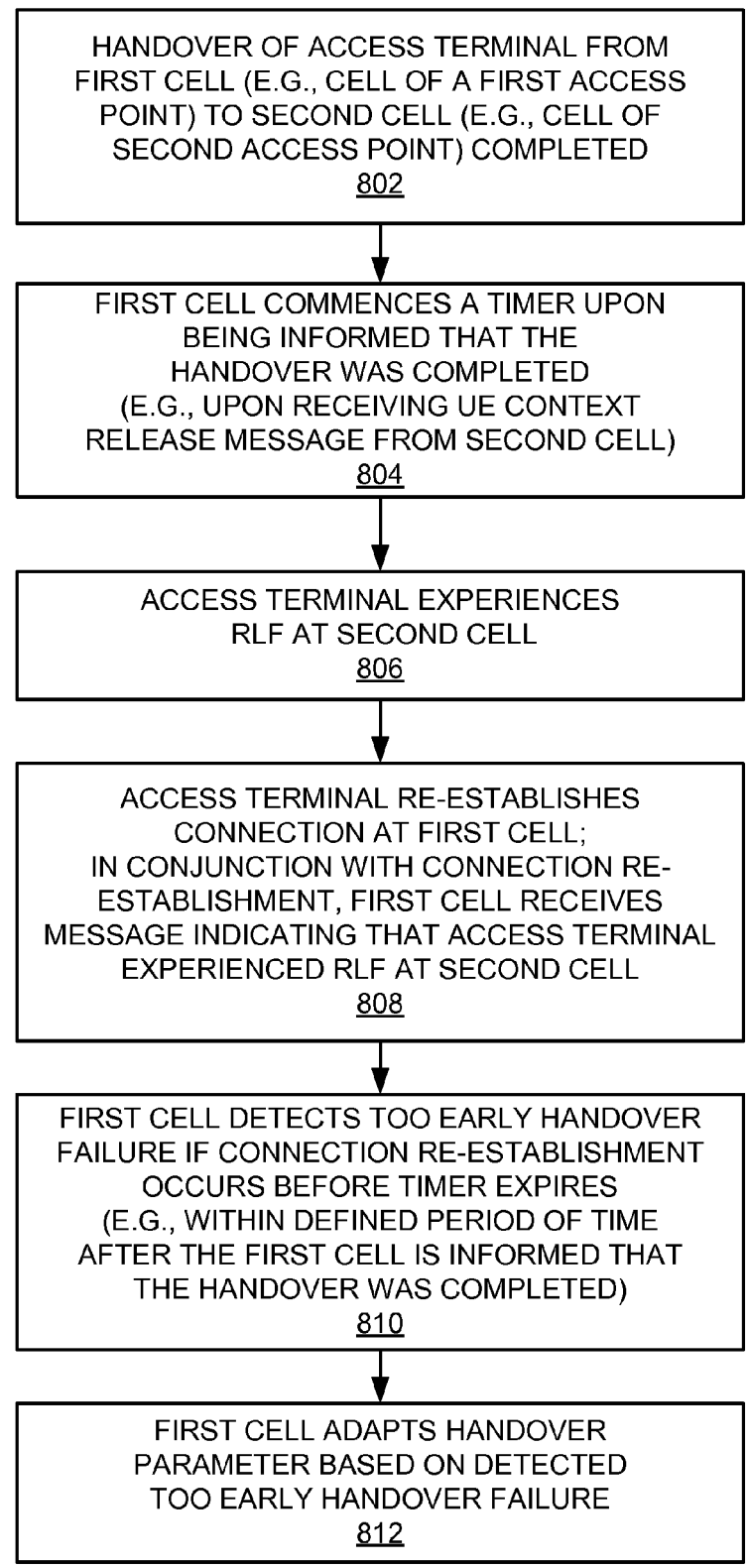
FIG. 8 is a flowchart of several sample aspects of operations that may be performed to detect a first type of too early handover failure and, in response, adapt handover parameters to mitigate too early handover failures.

Referring to the type 2 too early handover operations of FIG. 8, as represented by block 802, the access terminal is successfully handed-over from the first cell to the second cell. Here, the first cell commences a timer upon being informed that the handover was completed (block 804). For example, the timer may be started once the first cell receives a UE context release message from the second cell.

As represented by block 806, the access terminal experiences RLF at the second cell (e.g., as discussed herein). As represented by block 808, the access terminal re-establishes the connection at the first cell. As discussed herein, in conjunction with the re-establishment of the connection, the first cell receives a message from the access terminal that indicates that the access terminal experienced RLF at the second cell.

As represented by block 810, the first cell detects too early handover failure based on the connection re-establishment. For example, if the connection re-establishment occurs before the timer expires, the first cell may conclude that this is the case of a type 2 too early handover. Thus, in some aspects, the detection of block 810 may comprise detecting RLF due to too early handover, wherein the detection may comprise determining at a first cell (or access point) that an access terminal that was handed-over from the first cell to a second cell (or access point) re-established a connection at the first cell within a defined period of time after the first cell is informed that the handover was completed. As discussed herein, in some aspects, the defined period of time may be configured based on a message received from a network management system.

As represented by block 812, the first cell may then adapt one or more handover parameters based on the detection of too early handover failure. Various types of handover parameters may be adapted in this case. For example, at least one of: a time-to-trigger (TTT) parameter, an offset for a serving cell, a Cell Individual Offset (CIO), or a hysteresis parameter for an event, may be increased to reduce the likelihood that too early handovers will occur in the future.

Figure 9A:
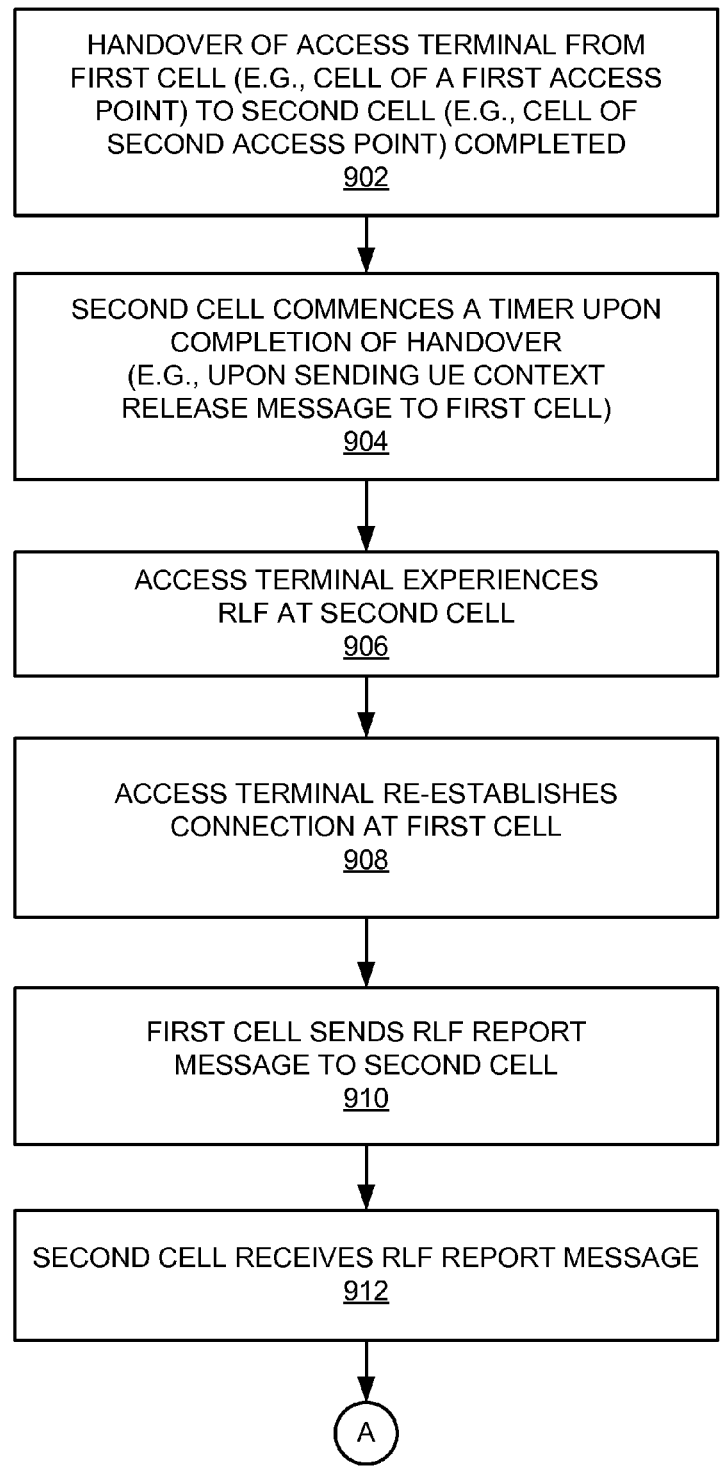
FIGS. 9A and 9B are a flowchart of several sample aspects of operations that may be performed to detect a second type of too early handover failure and, in response, adapt handover parameters to mitigate handovers to the wrong cell.
Figure 9B:
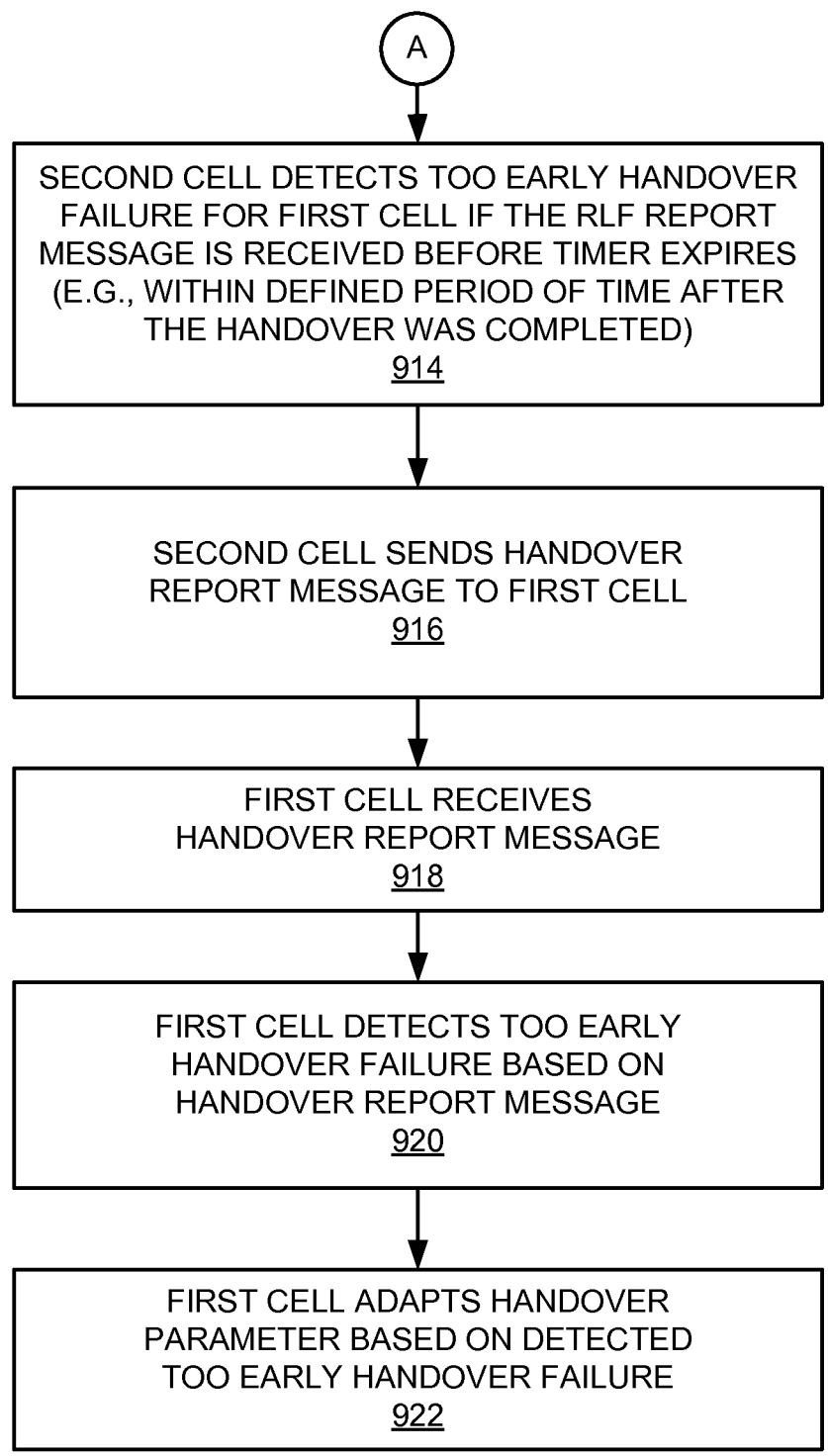

As discussed above, in some cases, the first cell may send an RLF report message to the second cell as a result of the connection re-establishment by the access terminal at the first cell, whereupon the second cell sends a handover report message back to the first cell. FIGS. 9A and 9B describe sample operations that may be performed in this case.

As represented by block 902, the access terminal is successfully handed-over from the first cell to the second cell. Here, the second cell commences a timer upon completion of the handover (block 904). As represented by block 906, the access terminal experiences RLF at the second cell (e.g., as discussed herein). As represented by block 908, the access terminal re-establishes the connection at the first cell as discussed herein. As represented by block 910, the first cell sends an RLF report message to the second cell. The second cell receives this message as represented by block 912.

As represented by block 914, if the second cell receives the RLF report message (e.g., the connection re-establishment occurred) before the timer expires, the second cell determines that this event relates to a type 2 too early handover for the first cell. Consequently, the second cell sends a handover report message to the first cell at block 916, and this message is received by the first cell at block 918. Thus, in some aspects, the handover report message may be sent as a result of a determination that the RLF report message was received within a defined period of time after the access terminal was handed-over. As discussed herein, the defined period of time may commence upon sending of a message (e.g., a UE context release message) requesting deletion of a data record pertaining to the access terminal in the first cell (e.g., first access point). Also, the defined period of time may be configured based on a message received from a network management system. As discussed herein, this message may comprise an indication of a type of handover failure associated with the RLF (e.g., a too early handover indication). In addition, this message may comprise, for example, an identifier of a cell at which the RLF occurred, an identifier of a cell at which the connection was re-established, and an identifier of the access terminal.

As represented by block 920, the first cell detects too late handover failure based on the received handover report message. Thus, in some aspects, the detection of block 920 may comprise detecting RLF due to too early handover, wherein the detection may comprise receiving a message from a second cell (or access point) at a first cell (or access point), wherein the message indicates that RLF reported by the first cell to the second cell was caused by the first cell handing the access terminal over to the second cell too soon. As represented by block 922, the first cell adapts one or more handover parameters based on the detection of too early handover failure.

Figure 10:
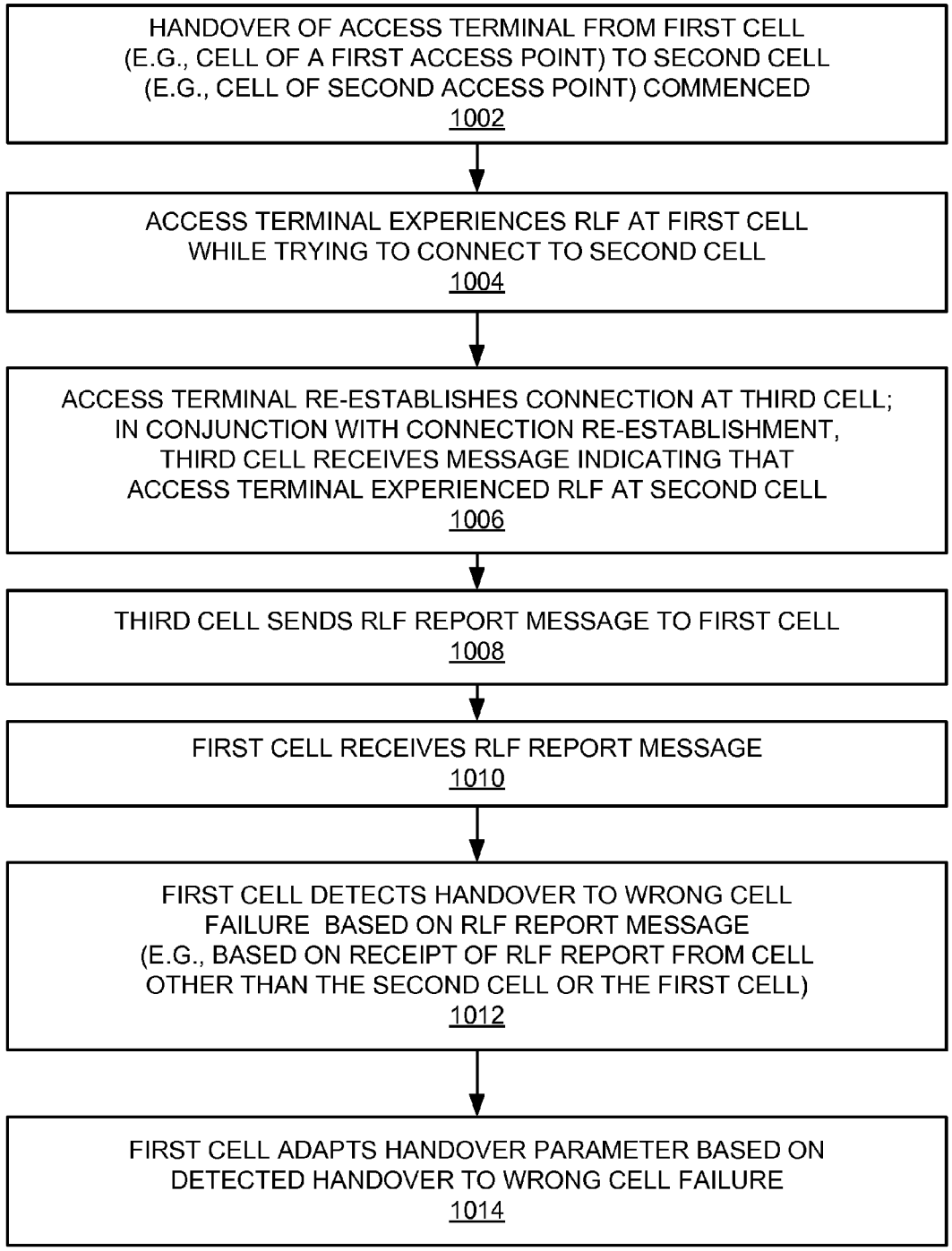
FIG. 10 is a flowchart of several sample aspects of additional operations that may be performed to detect a first type of handover to the wrong cell and, in response, adapt handover parameters to mitigate handovers to the wrong cell.
Figure 11A:
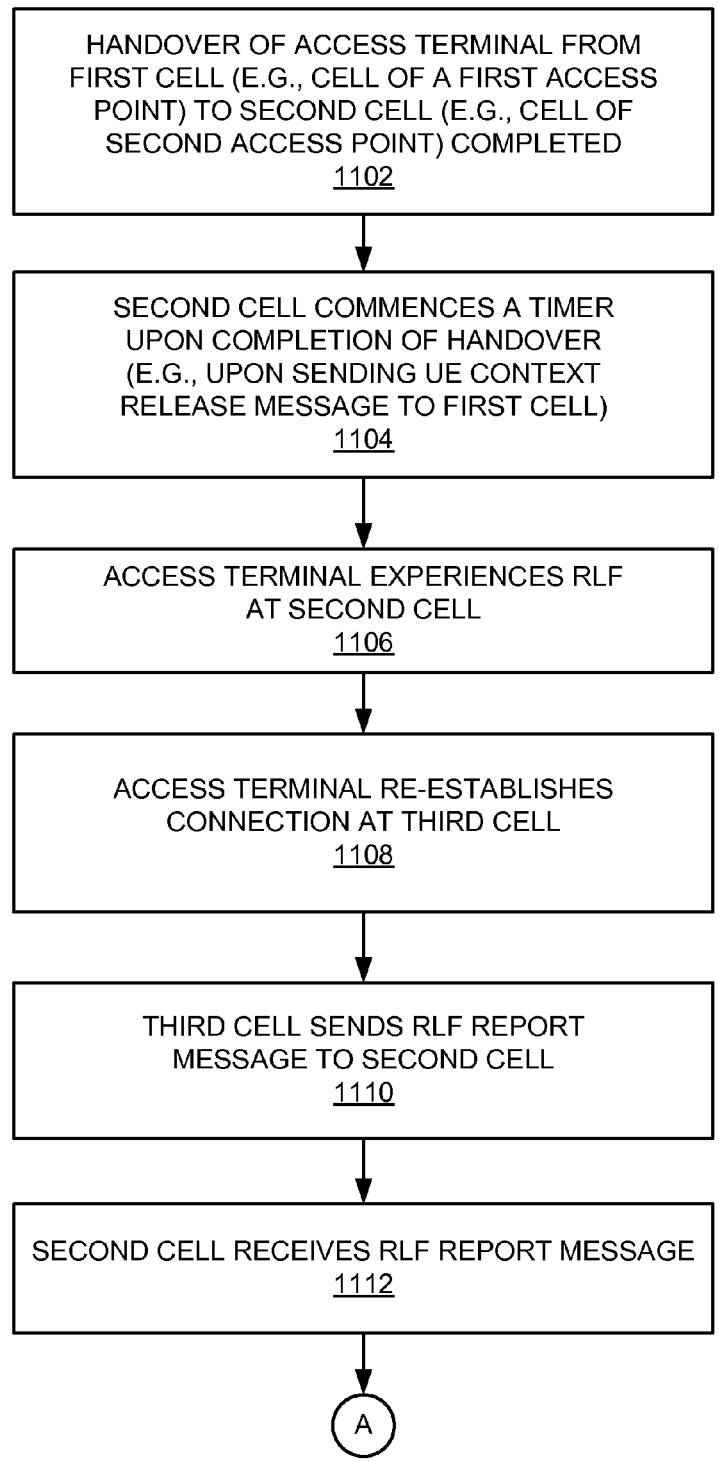
FIGS. 11A and 11B are a flowchart of several sample aspects of operations that may be performed to detect a second type of handover to the wrong cell and, in response, adapt handover parameters to mitigate handovers to the wrong cell.
Figure 11B:
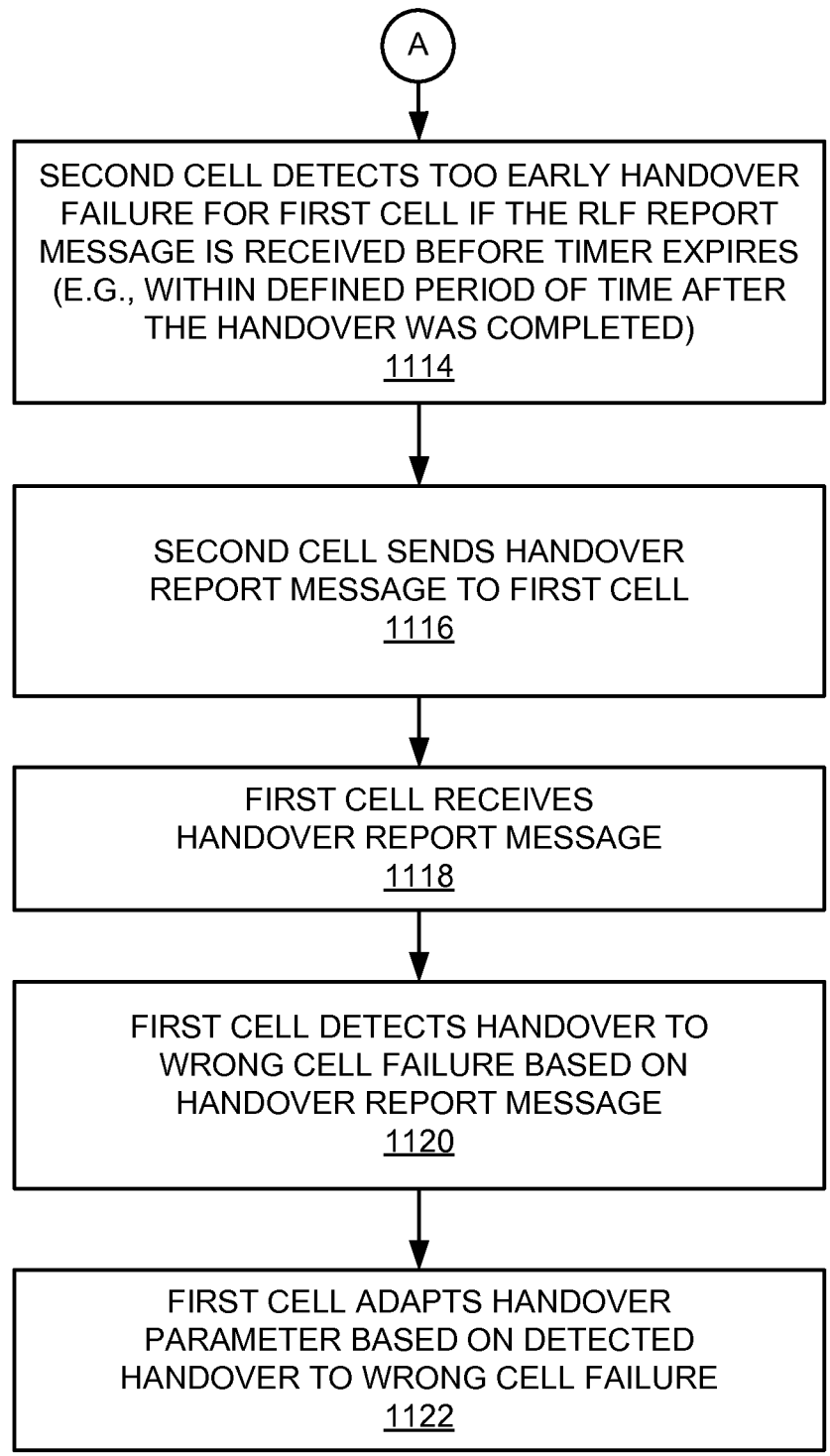

The flowcharts of FIGS. 10-11B describe operations that may be employed to provide handover parameter adaptation based on detection of handover to the wrong cell. FIG. 10 relates to the first type of handover to the wrong cell as discussed herein and FIGS. 11A-11B relate to the second type of handover to the wrong cell as discussed herein.

As represented by block 1002, while connected to the first cell, handover of the access terminal to the second cell is commenced. For example, the first cell may send a handover command message to the access terminal and store the access terminal context (UE context).

As represented by block 1004, the access terminal experiences RLF at the first cell during the handover procedure (e.g., while attempting to connect to the second cell). As discussed herein, the RLF may have occurred as a result of inadequate configuration of handover triggering parameters at the first cell (e.g., first access point) that caused handover to the wrong cell.

As represented by block 1006, the access terminal re-establishes the connection at a third cell. As discussed herein, in conjunction with the re-establishment of the connection, the third cell receives a message from the access terminal that indicates that the access terminal experienced RLF at the second cell.

As represented by block 1008, the third cell sends an RLF report message to the first cell, and this message is received by the first cell at block 1010.

As represented by block 1012, the first cell detects type 1 handover to the wrong cell based on the received RLF report message (e.g., based on a received indication of RLF). Here, the first cell may compare the identifier of the target with the identifier of the cell (access point) from which the RLF report was received. If the identifier of the cell (access point) from which the RLF report was received is not identical to the identifier of either the source or the target, then the first cell may conclude that the handover was triggered towards a wrong cell. Thus, in some aspects, the detection of block 1012 may comprise determining at a first cell (or access point) that an access terminal that re-established a connection at a second cell (or access point) experienced RLF at a third cell (or access point) due to a misdirected handover of the access terminal from the first cell to the third cell.

As represented by block 1014, the first cell may thus adapt one or more handover parameters based on the detection of handover to the wrong cell. Various types of handover parameters may be adapted in this case. For example, a Cell Individual Offset (CIO) setting may be adapted to reduce the likelihood of handovers to the wrong cell in the future. In addition, other parameters such as a time-to-trigger (TTT) parameter, an offset for a serving cell, or a hysteresis parameter for an event, may be adapted here.

The adaptation of handover parameters as taught herein may take into account one or more handover failure events. For example, a handover parameter may be adapted for specified cell based on detected handover to the wrong cell associated with the specified cell and/or some other cell(s). Alternatively, a handover parameter may be adapted for a set of specified cells based on detected handover to the wrong cell associated with those specified cells and/or some other cell(s).

Referring now to the type 2 handover to the wrong cell operations of FIG. 11, as represented by block 1102, the access terminal is successfully handed-over from the first cell to the second cell. Here, the second cell sends a UE context release message for the access terminal to the first cell and commences a timer (e.g., upon completion of the handover) as represented by block 1104. As represented by blocks 1106 and 1108, the access terminal experiences RLF at the second cell and re-establishes the connection at the third cell as discussed herein. As represented by block 1110, the third cell sends an RLF report message to the second cell. The second cell receives this message as represented by block 1112.

As represented by block 1114, if the RLF report message is received before the timer expires, the second cell determines that this event relates to a type 2 handover to the wrong cell event for the first cell. For example, the second cell may compare the identifier of the source cell (access point) with the identifier of the cell (access point) from which the RLF report was received. If the identifier of the cell from which the RLF report was received is identical to the identifier of the source cell, the second cell may elect to ignore the RLF report. On the other hand, if the identifier of the cell from which the RLF report was received is not identical to the identifier of the source cell, the second cell sends a handover report message to the source cell (first cell) at block 1116 (including a handover to wrong cell indication). This message is received by the first cell at block 1118. Thus, in some aspects, the handover report message may be sent as a result of a determination that the RLF report message was received within a defined period of time after the access terminal was handed-over. As discussed herein, the defined period of time may commence upon sending of a message (e.g., a UE context release message) requesting deletion of a data record pertaining to the access terminal in the first cell (e.g., first access point). Also, the defined period of time may be configured based on a message received from a network management system. As discussed herein, this message may comprise an indication of a type of handover failure associated with the RLF (e.g., a handover to a wrong cell indication). In addition, this message may comprise, for example, an identifier of a cell at which the RLF occurred, an identifier of a cell at which the connection was re-established, an identifier of a handover source cell, and an identifier of the access terminal.

As represented by block 1120, the first cell detects a handover to the wrong cell failure based on the received handover report message. Thus, in some aspects, the detection of block 1120 may be based on a handover report message received at a first cell (or access point) from a second cell (or access point), wherein the handover message indicates that an access terminal that re-established a connection at a third cell (or access point) experienced RLF at the second cell during a handover of the access terminal from the first cell to the second cell. As represented by block 1122, the first cell adapts one or more handover parameters based on the detection of handover to the wrong cell.

Figure 12:
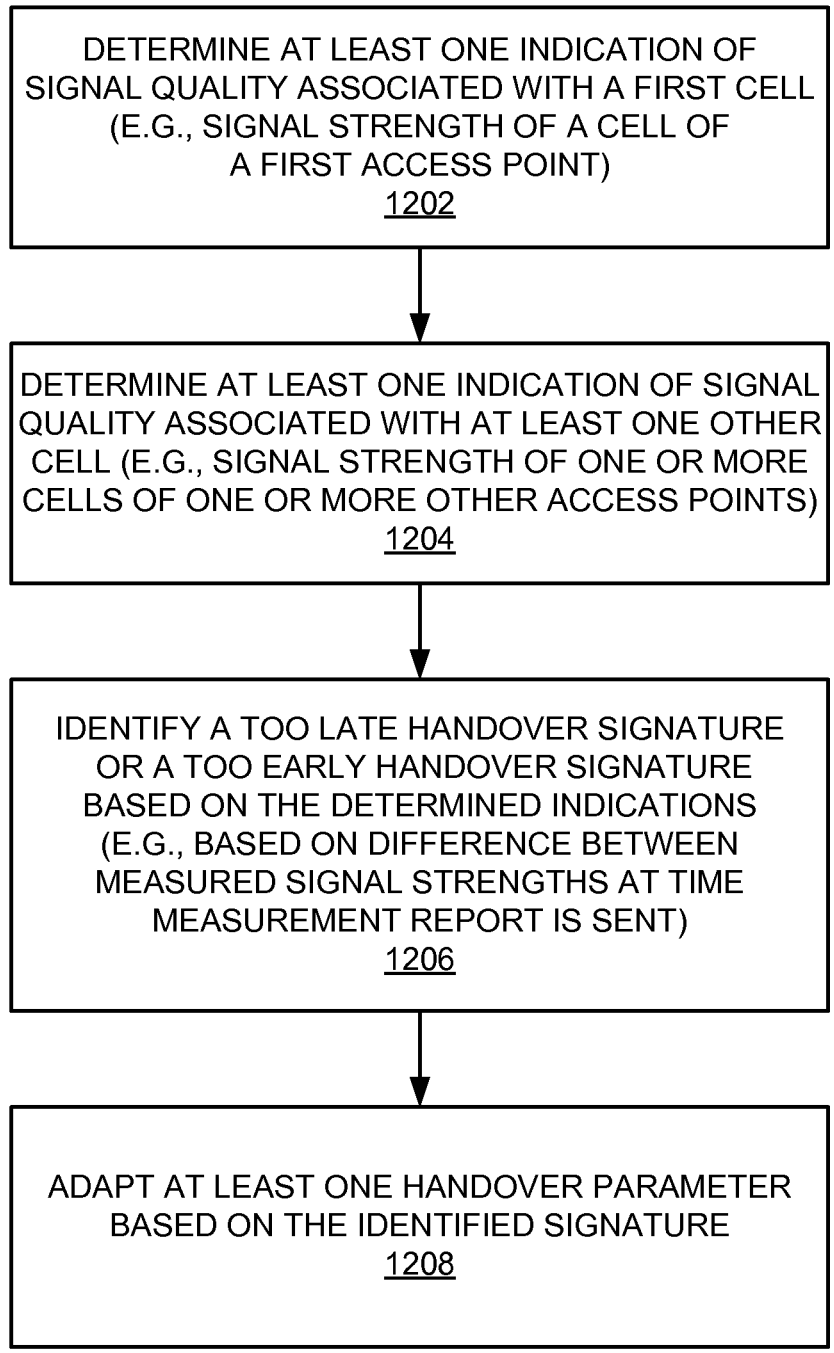
FIG. 12 is a flowchart of several sample aspects of operations that may be performed to proactively detect handover-related failures.
Figure 13A:
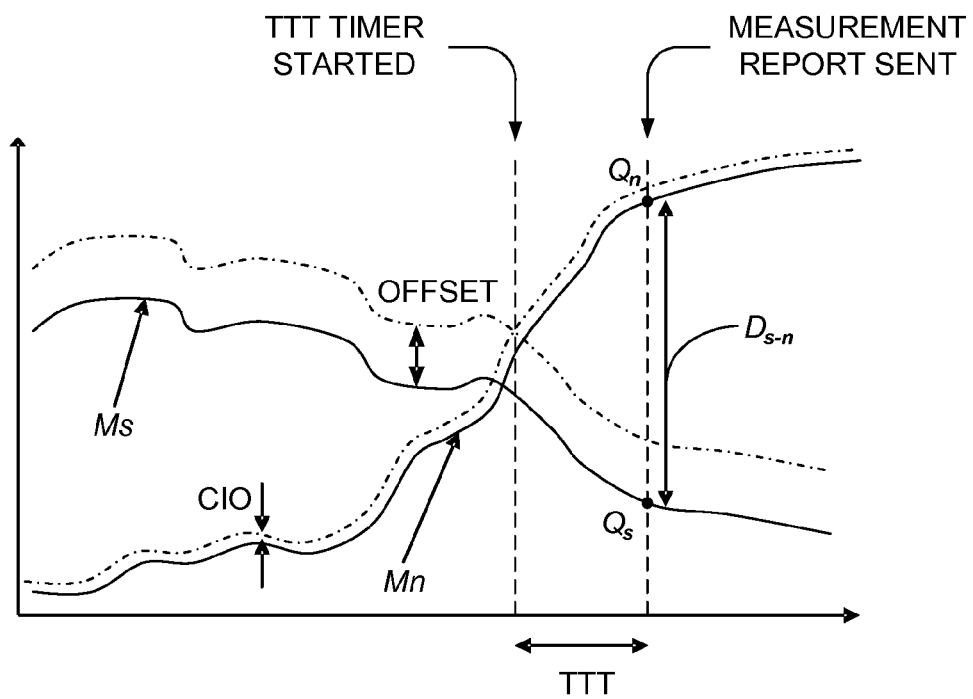
FIGS. 13A and 13B are simplified diagrams illustrating indications of signal quality that may be used to proactively detect handover-related failures.
Figure 13B:
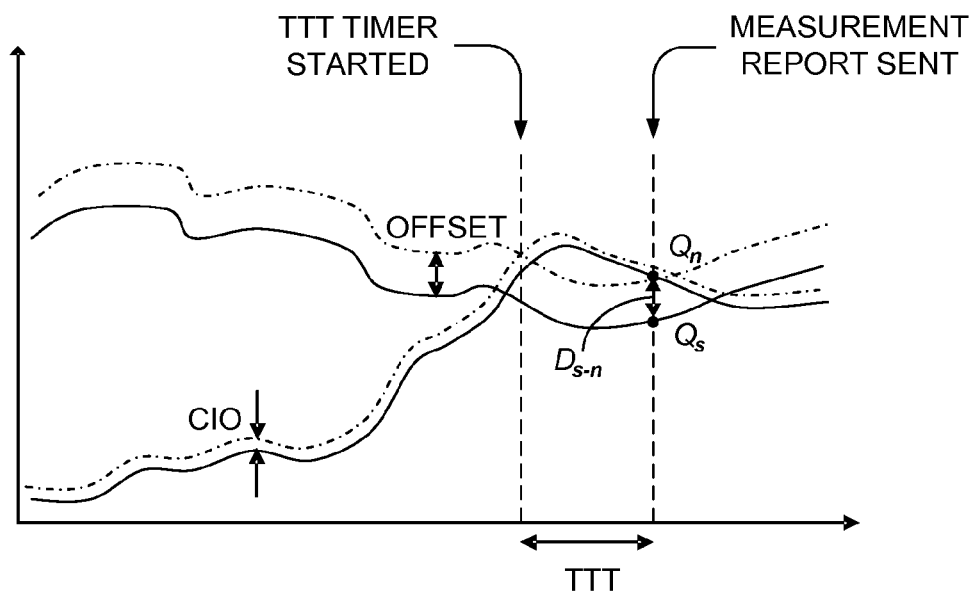

FIGS. 12-13B describe techniques that may be employed to provide proactive handover parameter adaptation. In some aspects, proactive detection is aimed at preventing future occurrences from happening based on analysis of conditions prior to the occurrences.

As represented by blocks 1202 and 1204 of FIG. 12, a cell (an access point) may determine (e.g., monitor) indications of signal quality (e.g., received signal strengths) of itself and of other surrounding cells as reported by any access terminals whose measurement reports were received by the cell. FIGS. 13A and 13B depict sample graphs of reported quality indications Qn and Qs for a serving cell (line Mn) and a target cell (line Ms), respectively. These quality indications may correspond to, for example, reference signal received quality (RSRQ), reference signal received power (RSRP), or some other suitable quality metric.

The graphs illustrate certain parameters that may be used to determine when to trigger a measurement report. For example, the offset (e.g., hysteresis) may indicate the amount by which the target quality indication must exceed the serving cell indication before measurement reporting is triggered. In addition, time-to-trigger (TTT) may indicate the minimum amount of time that the above condition must be continuously met before a measurement report is sent. In some cases, the indications of blocks 1202 and 1204 may be measured when a measurement report is sent by an access terminal.

As represented by block 1206, the cell may identify a too late handover or a too early handover (e.g., a too late or too early handover signature) based on the determined indications of signal quality. For example, a signature of a likelihood of too late handovers may be identified based on whether Qs is low and/or based on whether the difference (Ds-n) between the quality indications when the measurement report is sent by the access terminal is large as compared to the offset (e.g., the difference exceeds a defined offset by a defined amount). This condition is depicted in FIG. 13A. Conversely, a signature of a likelihood of too early handovers may be identified based on whether Qs is not low and/or based on whether the difference (Ds-n) between the quality indications when the measurement report is sent is small as compared to the offset (e.g., the difference exceeds a defined offset by less than a defined amount). This condition is depicted in FIG. 13B.

As represented by block 1208, the cell may then adapt one or more handover parameters, if applicable, to reduce the likelihood of too late handovers or too early handovers in the future (e.g., proactively mitigate too late or too early handovers). Thus, in some aspects, a handover parameter may be adapted based on the indications determined at blocks 1202 and 1204 (e.g., based on a difference between these indications, based on a too late or too early handover signature, etc.). These parameters (e.g., TTT, an offset for a serving cell, CIO, a hysteresis parameter, or some combination thereof) may be adapted, for example, as discussed herein.

Figure 14:
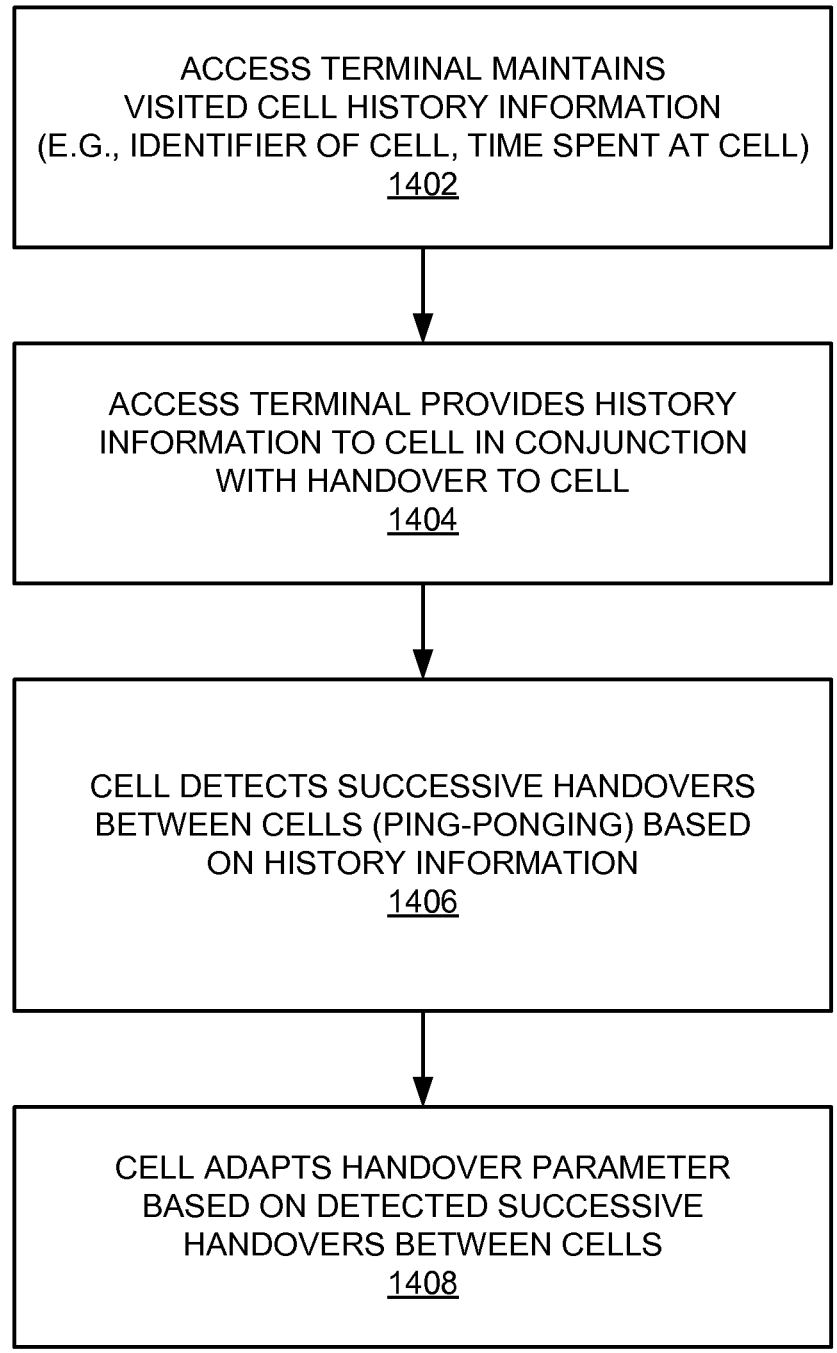
FIG. 14 is a flowchart of several sample aspects of operations that may be performed to mitigate ping-ponging.

FIG. 14 describes operations that may be employed to provide handover parameter adaptation based on detection of ping-ponging. Here, ping-ponging may be defined as successive avoidable handovers between cells. In some aspects, the detection of ping-ponging may involve the exchange of access terminal-specific information between the cells involved in the ping-ponging. This information may include, for example, the identities of the cells that the access terminal has recently visited and the sojourn time for the access terminal in each visited cell.

As represented by block 1402 of FIG. 14, the access terminal may thus maintain visited cell history information. For example, for each visited cell in a last visited cell list, the access terminal may maintain an identifier (e.g., GCI) of the cell, an indication of the cell type, and an indication of the amount of time the access terminal stayed in the cell.

As represented by block 1404, the access terminal then provides this information to a cell. For example, the access terminal may provide this information to a cell in conjunction with handover of the cell. The cells in the system may then share this information. For example, a cell may send an information element (e.g., UE history information) in a handover request message that includes the access terminal history information.

As represented by block 1406, the cells may then detect ping-ponging based on the history information. For example, each cell may examine the history information to determine whether the access terminal has been successively handed-over between two cells, and whether the access terminal has only stayed at each cell for relatively short periods of time.

As represented by block 1408, if ping-ponging is detected, a cell may adapt one or more of its handover parameters (e.g., TTT, an offset for a serving cell, CIO, a hysteresis parameter, or some combination thereof) in an attempt to prevent such ping-ponging in the future. For example, an incorrect setting of hysteresis may result in ping-ponging. Thus, upon detection of ping-ponging, a hysteresis parameter may be adapted in an attempt to reduce ping-ponging.

In some aspects, an operator (e.g., via an OAM) may configure parameters based on network management policies and the operator's knowledge of the network. For example, a network operator may configure a parameter based on knowledge about levels and patterns of user mobility and their fluctuations, desired trade-offs between handover performance and required network resources, and acceptable impact of handover parameters on load-balancing.

As discussed above, handover-related parameters may be autoconfigurable by the access point entities (e.g., self organizing network entities). In addition, in some implementations, a valid set of values (e.g., range of values, enumerated values, etc.) for these parameters may be provided to the access points (e.g., by an operator). In such a case, an access point may select a value from within the configured set of values (e.g., using handover parameter optimization algorithms as taught herein).

In addition, parameters used to detect handover failure may be configurable. For example, the timer values described above (e.g., $t_{early\_HO\_source}$, $t_{early\_HO\_target}$, $t_{store\_UE\_context}$) may be configured by an operator (e.g., via an OAM) and provided to the access points. In some implementations, this may involve providing a valid set of values from which the access points may select a desired value.

In some implementations, the OAM may configure a parameter to the same value for all access points (or cells) in a network or may configure different values in different access points based on at least one of: their location, handover patterns, load, resource availability, vendor, or some other factor or factors.

Figure 15:
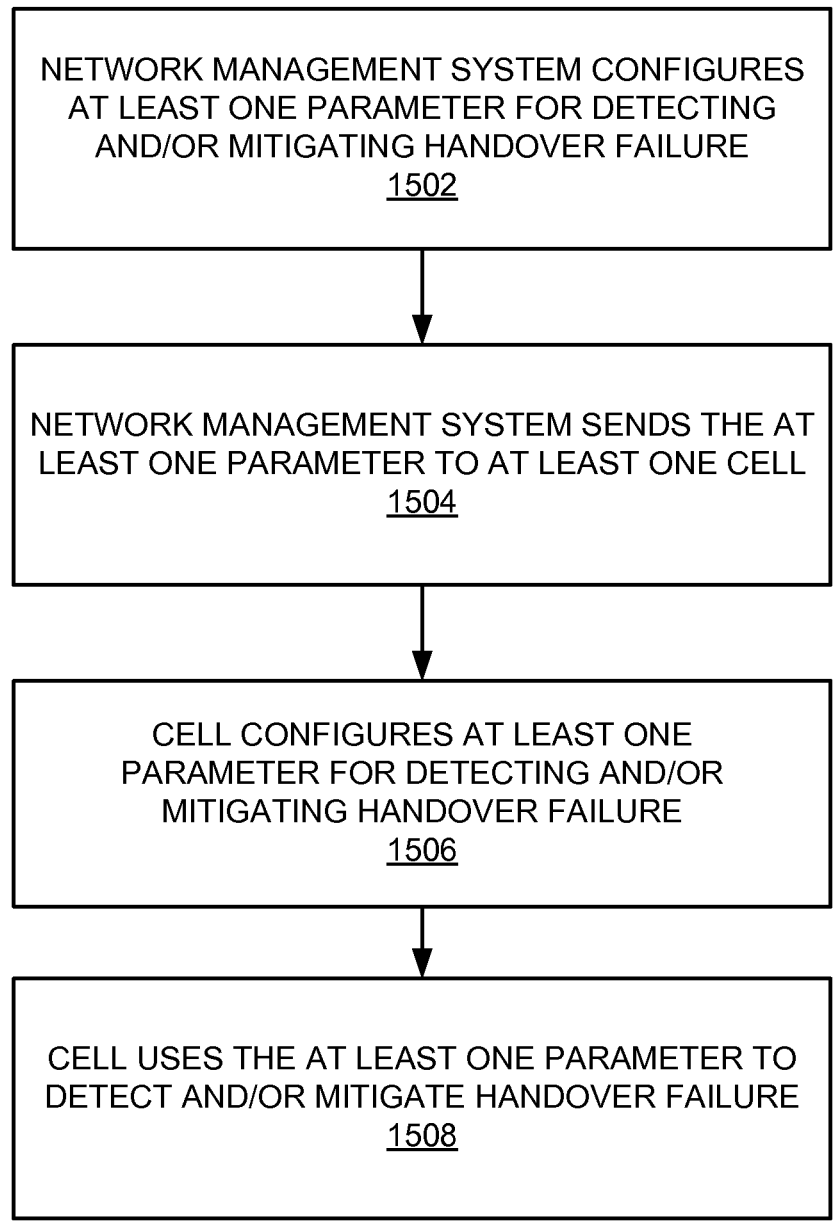
FIG. 15 is a flowchart of several sample aspects of operations that may be performed to configure handover-related parameters.

FIG. 15 describes operations that may be employed to configure parameters for handover-related operations. These operations may be performed, for example, by a network management system (e.g., an OAM) implemented at one or more network nodes or some other suitable location (e.g., in one or more access points). As represented by block 1502, a network management system configures one or more parameters for detecting and/or mitigating handover failure. As discussed herein, such a parameter may comprise, for example, a parameter for use by a cell to determine whether an access terminal was handed-over too early, a parameter configured to mitigate too early handovers, a parameter (e.g., a defined period of time) for use by a source cell to determine whether an access terminal re-established a connection at the source cell within a defined period of time after the access terminal was handed-over to a target cell, a parameter (e.g., a defined period of time) for use by a target cell to determine whether an RLF report is received for an access terminal within a defined period of time after the access terminal was handed-over to a target cell, a parameter for use by a cell to determine whether an access terminal was handed-over to a wrong cell, a parameter configured to mitigate handovers to wrong cells, or a parameter (e.g., a defined period of time) for use by a target cell to determine whether an RLF report is received for an access terminal within a defined period of time after the access terminal was handed-over to the target cell.

As represented by block 1504, the network management system sends the configured parameter(s) to one or more cells (or access points) in the network. As represented by block 1506, each cell (or access point) may configure one or more of these parameters (e.g., handover parameters). As represented by block 1508, each cell (or access point) may use one or more of these parameters (e.g., timer values) to detect and/or mitigate handover failure as taught herein.

Figure 16:
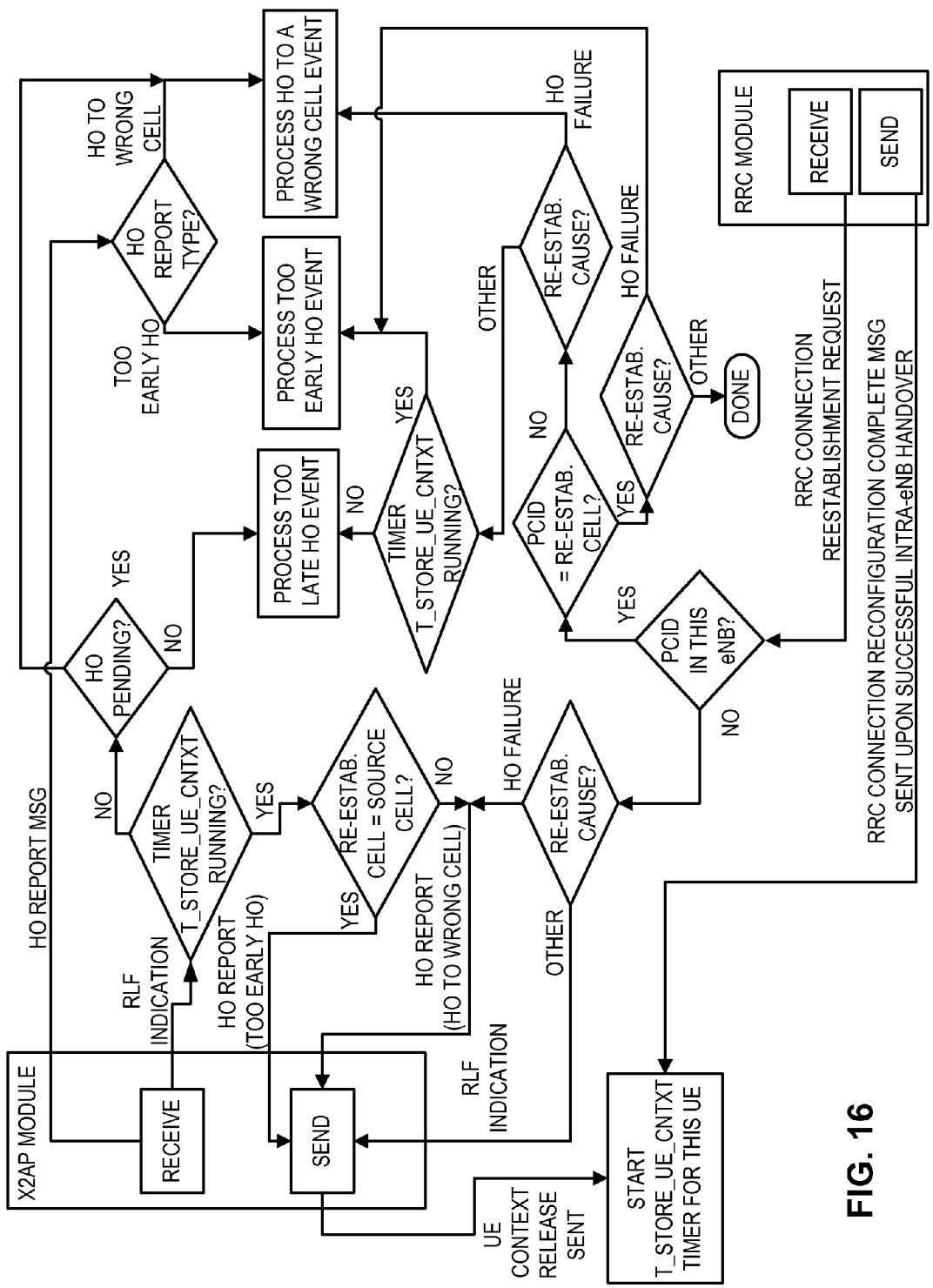
FIG. 16 is a flowchart of several sample aspects of operations that may be performed to handle intra-access point and inter-access point handover-related failures.

FIG. 16 describes operations that may be employed in conjunction with incorrect handover (HO) parameter detection for intra-access point handover and inter-access point handover. In this example, an access point exchanges messages with other access points via an X2-AP protocol module. In addition RRC messages are sent and received via an RRC module. In general, the illustrated operations are similar to corresponding operations described herein. Of note, this example illustrates how an access point may concurrently detect different types of handover-related failures and adapt handover parameters (via the process blocks).

Figure 17:
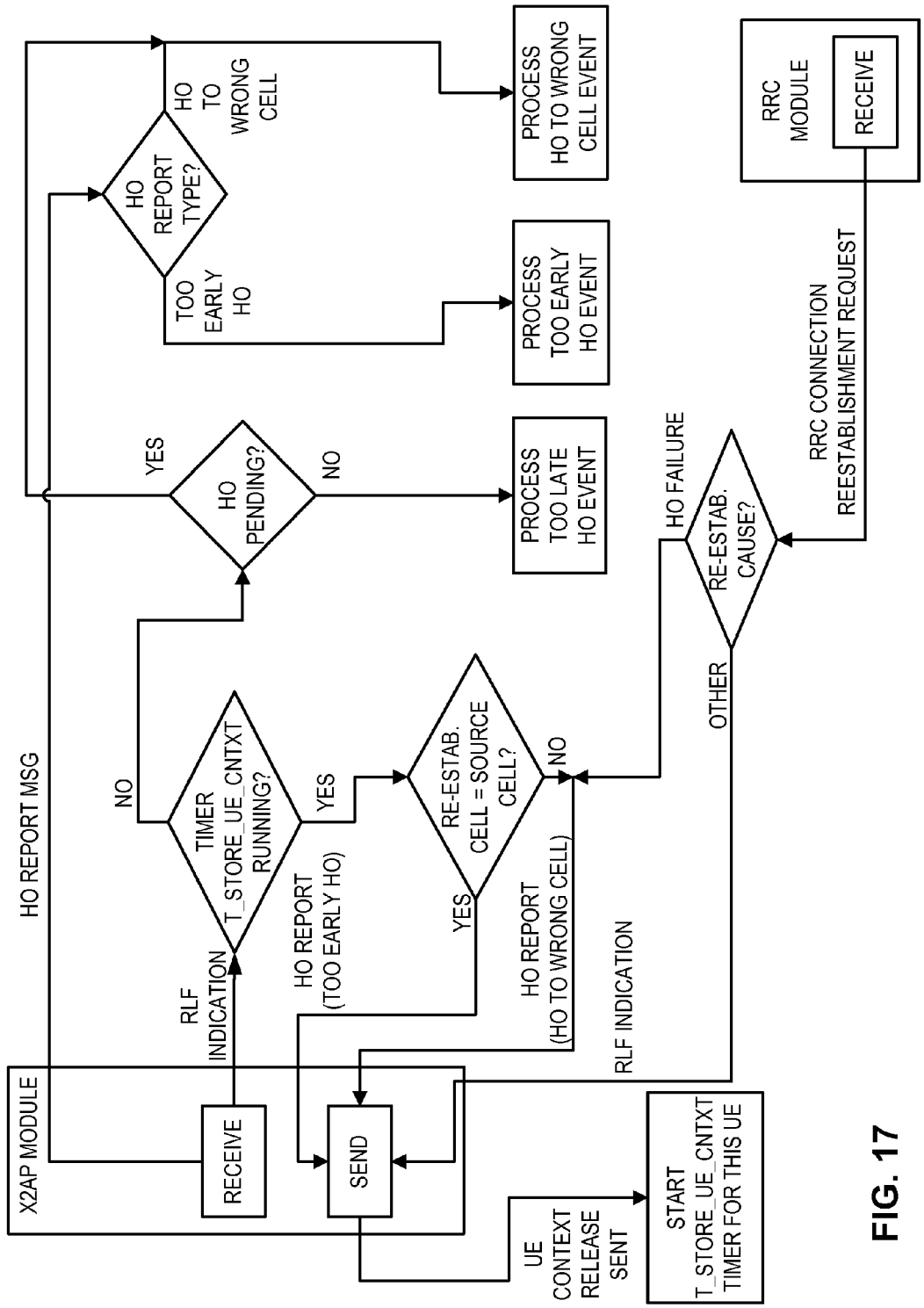
FIG. 17 is a flowchart of several sample aspects of operations that may be performed to handle inter-access point handover-related failures.

FIG. 17 describes operations that may be employed in conjunction with incorrect handover parameter detection for inter-access point handover. In this example, an access point exchanges messages with other access points via an X2-AP protocol module. In addition RRC messages are received via an RRC module. In general, the illustrated operations are similar to corresponding operations described herein. Of note, this example illustrates how an access point may concurrently detect different types of handover-related failures and adapt handover parameters (via the process blocks).

Figure 18:
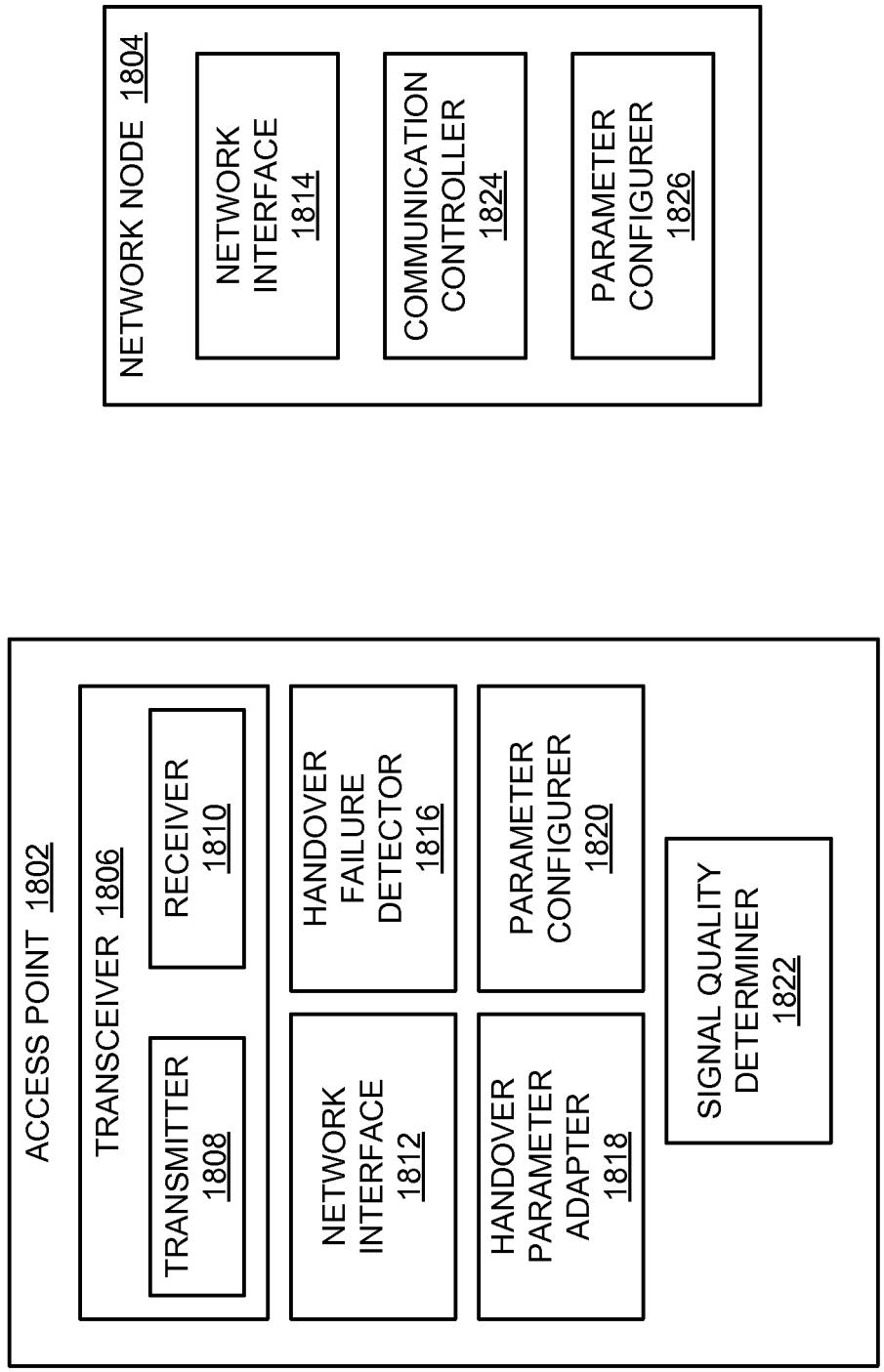
FIG. 18 is a simplified block diagram of several sample aspects of components that may be employed in communication nodes.

FIG. 18 illustrates several sample components that may be incorporated into nodes such as an access point 1802 (e.g., corresponding to the access points 104-108) and a network node 1804 (e.g., corresponding to the network management system 118) to perform handover parameter adaptation operations as taught herein. The described components also may be incorporated into other nodes in a communication system. For example, other nodes in a system may include components similar to those described for the access point 1802 to provide similar functionality. A given node may contain one or more of the described components. For example, an access point may contain multiple transceiver components that enable the access terminal to operate on multiple frequencies and/or communicate via different technologies.

As shown in FIG. 18, the access point 1802 may include a transceiver 1806 for communicating with other nodes. The transceiver 1806 includes a transmitter 1808 for sending signals (e.g., messages) and a receiver 1810 for receiving signals (e.g., messages).

The access point 1802 and the network node 1804 also may include network interfaces 1812 and 1814, respectively, for communicating with one another or other network nodes. For example, the network interfaces 1812 and 1814 may be configured to communicate with one or more network nodes via a wired or wireless backhaul.

The access point 1802 and the network node 1804 also include other components that may be used in conjunction with handover parameter adaptation operations as taught herein. For example, the access point 1802 may include a handover failure detector 1816 for detecting handover failure-related conditions (e.g., RLF due to too late handover, RLF due to too early handover, handover to a wrong cell, etc.) and for providing other related functionality as taught herein. The access point 1802 may include a handover parameter adapter 1818 for adapting handover-related parameters and for providing other related functionality as taught herein. The access point 1802 may include a parameter configurer 1820 for configuring parameters (e.g., a defined period of time) and for providing other related functionality as taught herein. The access point 1802 may include a signal quality determiner 1822 for determining signal quality (e.g., an indication of signal quality, received signal strength, etc.) and for providing other related functionality as taught herein. In addition, the network node 1804 may include a communication controller 1824 for sending parameters (e.g., via a message or some other suitable process) and for providing other related functionality as taught herein. Also, the network node 1804 may include a parameter configurer 1826 for configuring parameters (e.g., for detecting handover failure and/or for mitigating handover failure) and for providing other related functionality as taught herein.

For convenience the access point 1802 and the network node 1804 are shown in FIG. 18 as including components that may be used in the various examples described herein. In practice, one or more of the illustrated components may not be used in a given example. As an example, in some implementations the access point 104 may not include the signal quality determiner 1822.

Also, in some implementations the components of FIG. 18 may be implemented in one or more processors (e.g., that uses and/or incorporates data memory for storing information or code used by the processor(s) to provide this functionality). For example, the functionality of blocks 1816-1822 may be implemented by a processor or processors of an access point and data memory of the access point. In addition, the functionality of blocks 1824 and 1826 may be implemented by a processor or processors of a network node and data memory of a network node.

In some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage (e.g., coverage within a commercial building) over an area that is smaller than a macro area and larger than a femto area. In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells (e.g., sectors). A cell associated with a macro node, a femto node, or a pico node may be referred to as a macro cell, a femto cell, or a pico cell, respectively.

Access to a node may be restricted in some aspects. For example, a given femto node may only provide certain services to certain access terminals. In deployments with so-called restricted (or closed) access, a given access terminal may only be served by the macro cell mobile network and a defined set of femto nodes (e.g., the femto nodes that reside within the corresponding user residence). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto nodes) that share a common access control list of access terminals.

Various relationships may thus exist between a given femto node and a given access terminal. For example, from the perspective of an access terminal, an open femto node may refer to a femto node with unrestricted access (e.g., the femto node allows access to any access terminal). A restricted femto node may refer to a femto node that is restricted in some manner (e.g., restricted for access and/or registration). A home femto node may refer to a femto node on which the access terminal is authorized to access and operate on (e.g., permanent access is provided for a defined set of one or more access terminals). A guest (or hybrid) femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node installed in the residence of that access terminal's owner (usually the home access terminal has permanent access to that femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 19:
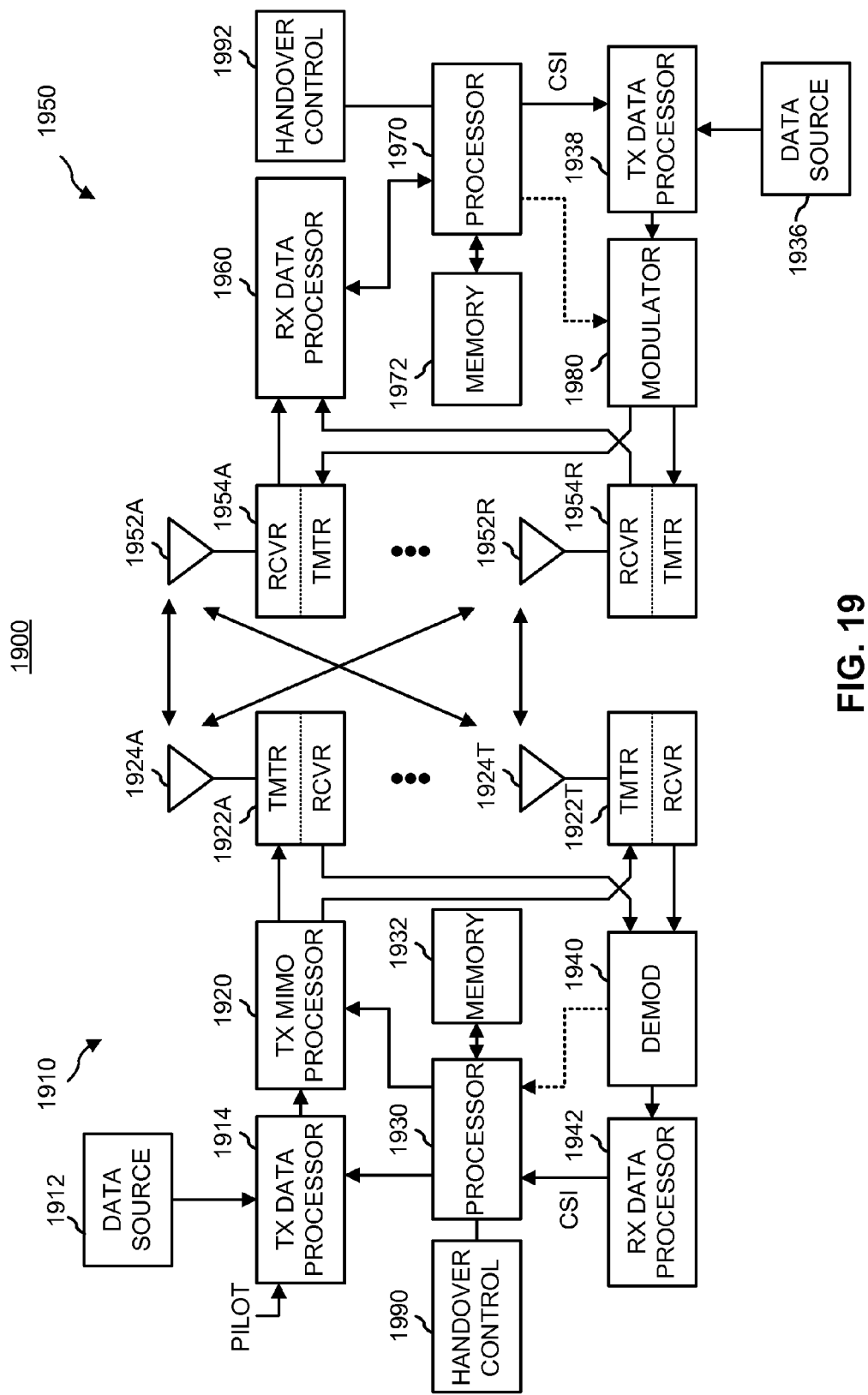
FIG. 19 is a simplified block diagram of several sample aspects of communication components.
Figure 20:
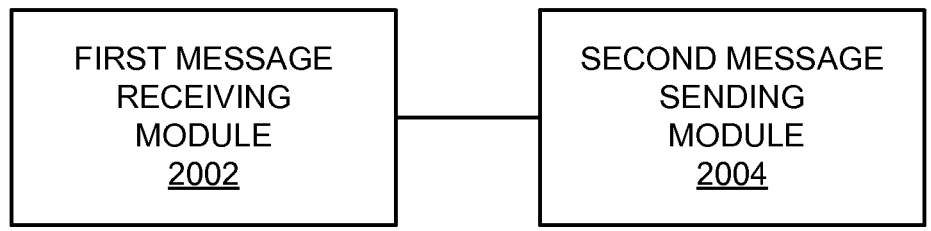
FIGS. 20-26 are simplified block diagrams of several sample aspects of apparatuses that may be employed in conjunction with providing handover parameter adaptation as taught herein.
Figure 21:
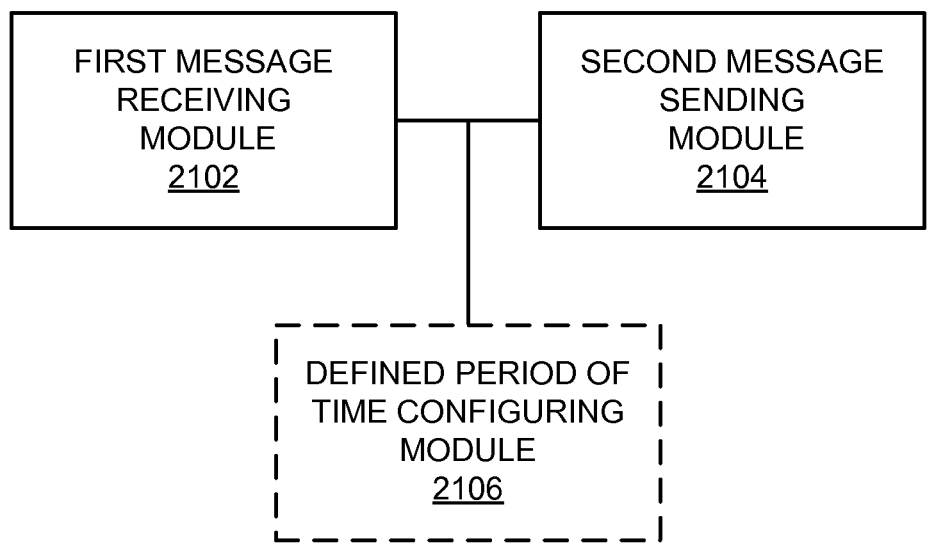
Figure 22:
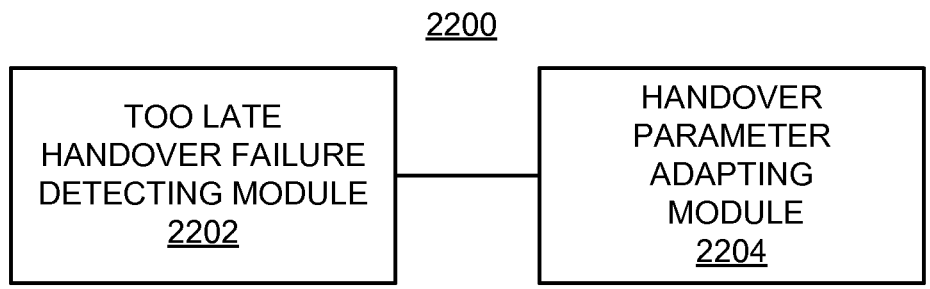
Figure 23:
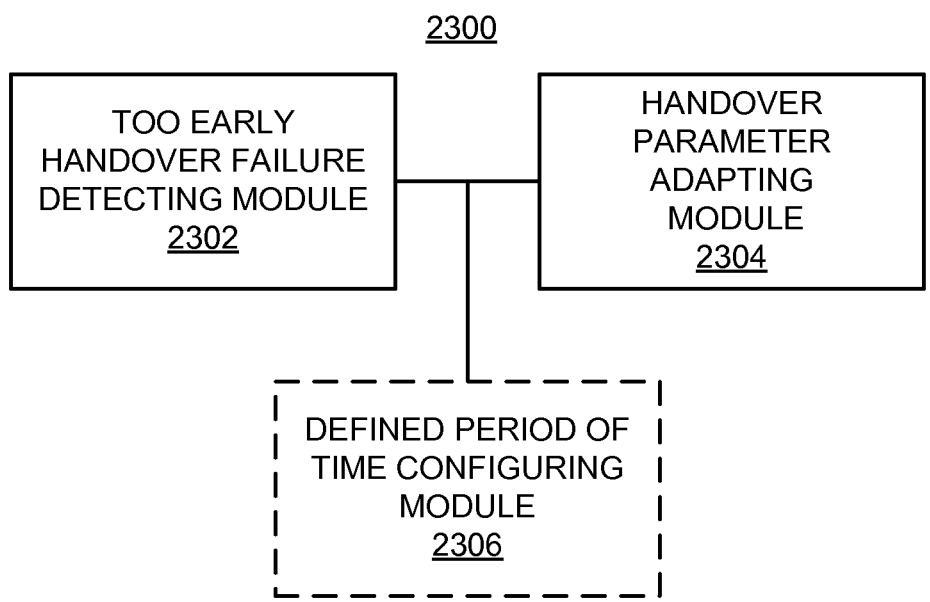
Figure 24:
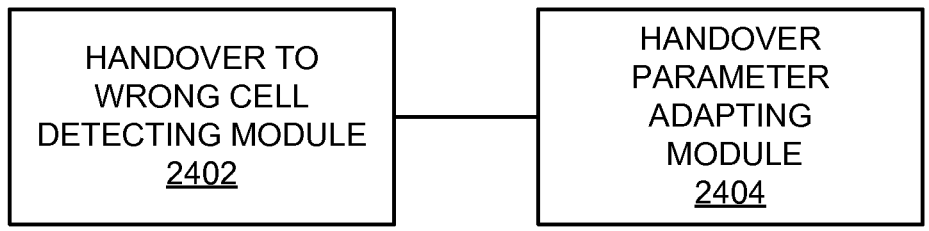
Figure 25:
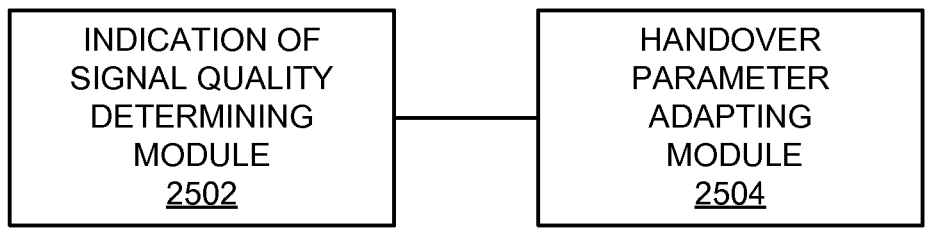
Figure 26:
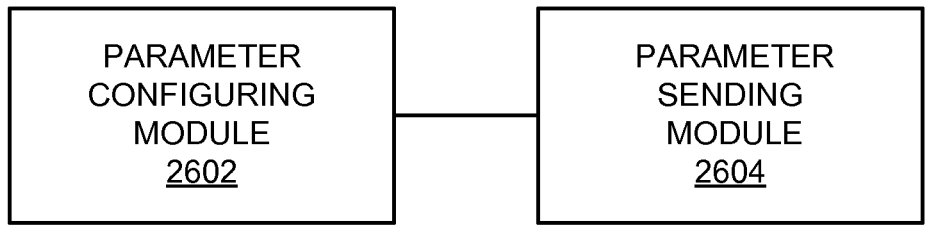

FIG. 19 illustrates a wireless device 1910 (e.g., an access point) and a wireless device 1950 (e.g., an access terminal) of a sample MIMO system 1900. At the device 1910, traffic data for a number of data streams is provided from a data source 1912 to a transmit (TX) data processor 1914. Each data stream may then be transmitted over a respective transmit antenna.

The TX data processor 1914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1930. A data memory 1932 may store program code, data, and other information used by the processor 1930 or other components of the device 1910.

The modulation symbols for all data streams are then provided to a TX MIMO processor 1920, which may further process the modulation symbols (e.g., for OFDM). The TX MIMO processor 1920 then provides $N_T$ modulation symbol streams to $N_T$ transceivers (XCVR) 1922A through 1922T. In some aspects, the TX MIMO processor 1920 applies beam-forming weights to the symbols of the data streams and to the antenna from which the symbol is being transmitted.

Each transceiver 1922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1922A through 1922T are then transmitted from $N_T$ antennas 1924A through 1924T, respectively.

At the device 1950, the transmitted modulated signals are received by $N_R$ antennas 1952A through 1952R and the received signal from each antenna 1952 is provided to a respective transceiver (XCVR) 1954A through 1954R. Each transceiver 1954 conditions (e.g., filters, amplifies, and downconverts) a respective received signal, digitizes the conditioned signal to provide samples, and further processes the samples to provide a corresponding "received" symbol stream.

A receive (RX) data processor 1960 then receives and processes the $N_R$ received symbol streams from $N_R$ transceivers 1954 based on a particular receiver processing technique to provide $N_T$ "detected" symbol streams. The RX data processor 1960 then demodulates, deinterleaves, and decodes each detected symbol stream to recover the traffic data for the data stream. The processing by the RX data processor 1960 is complementary to that performed by the TX MIMO processor 1920 and the TX data processor 1914 at the device 1910.

A processor 1970 periodically determines which pre-coding matrix to use (discussed below). The processor 1970 formulates a reverse link message comprising a matrix index portion and a rank value portion. A data memory 1972 may store program code, data, and other information used by the processor 1970 or other components of the device 1950.

The reverse link message may comprise various types of information regarding the communication link and/or the received data stream. The reverse link message is then processed by a TX data processor 1938, which also receives traffic data for a number of data streams from a data source 1936, modulated by a modulator 1980, conditioned by the transceivers 1954A through 1954R, and transmitted back to the device 1910.

At the device 1910, the modulated signals from the device 1950 are received by the antennas 1924, conditioned by the transceivers 1922, demodulated by a demodulator (DEMOD) 1940, and processed by a RX data processor 1942 to extract the reverse link message transmitted by the device 1950. The processor 1930 then determines which pre-coding matrix to use for determining the beam-forming weights then processes the extracted message.

FIG. 19 also illustrates that the communication components may include one or more components that perform handover control operations as taught herein. For example, a handover control component 1990 may cooperate with the processor 1930 and/or other components of the device 1910 to handover another device (e.g., device 1950) as taught herein. Similarly, a handover control component 1992 may cooperate with the processor 1970 and/or other components of the device 1950 to facilitate handing-over of the device 1950. It should be appreciated that for each device 1910 and 1950 the functionality of two or more of the described components may be provided by a single component. For example, a single processing component may provide the functionality of the handover control component 1990 and the processor 1930 and a single processing component may provide the functionality of the handover control component 1992 and the processor 1970.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 20-26, apparatuses 2000, 2100, 2200, 2300, 2400, 2500, and 2600 are represented as a series of interrelated functional modules. Here, a receiving module 2002 may correspond at least in some aspects to, for example, a receiver as discussed herein. A sending module 2004 may correspond at least in some aspects to, for example, a transmitter as discussed herein. A receiving module 2102 may correspond at least in some aspects to, for example, a receiver as discussed herein. A sending module 2104 may correspond at least in some aspects to, for example, a transmitter as discussed herein. A configuring module 2106 may correspond at least in some aspects to, for example, a parameter configurer (e.g., parameter configurer 1820) as discussed herein. A too late handover failure detecting module 2202 may correspond at least in some aspects to, for example, a handover failure detector as discussed herein. A handover parameter adapting module 2204 may correspond at least in some aspects to, for example, a handover parameter adapter as discussed herein. A too early handover failure detecting module 2302 may correspond at least in some aspects to, for example, a handover failure detector as discussed herein. A handover parameter adapting module 2304 may correspond at least in some aspects to, for example, a handover parameter adapter as discussed herein. A configuring module 2306 may correspond at least in some aspects to, for example, a parameter configurer (e.g., parameter configurer 1820) as discussed herein. A handover to wrong cell detecting module 2402 may correspond at least in some aspects to, for example, a handover failure detector as discussed herein. A handover parameter adapting module 2404 may correspond at least in some aspects to, for example, a handover parameter adapter as discussed herein. An indication of signal quality determining module 2502 may correspond at least in some aspects to, for example, a signal quality determiner detector as discussed herein. A handover parameter adapting module 2504 may correspond at least in some aspects to, for example, a handover parameter adapter as discussed herein. A parameter configuring module 2602 may correspond at least in some aspects to, for example, a parameter configurer (e.g., parameter configurer 1824) as discussed herein. A parameter sending module 2604 may correspond at least in some aspects to, for example, a communication controller as discussed herein.

The functionality of the modules of FIGS. 20-26 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 20-26 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach.

Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving a first message at a first access point from a second access point, wherein the first access point is a target cell and the first message indicates that an access terminal re-establishing a connection at the second access point experienced radio link failure at the first access point; and
   sending a second message from the first access point to one of the second access point or a third access point, wherein the second message comprises an indication of a type of handover failure associated with the radio link failure.

2. The method of claim 1, wherein the indication comprises a too early handover indication.

3. The method of claim 1, wherein the indication comprises a handover to wrong cell indication.

4. The method of claim 3, wherein:
   the access terminal was handed-over from the third access point to the first access point; and
   the second message is sent to the third access point as a result of a determination point that the first message was received within a defined period of time after the access terminal handoff is completed from the third access point to the first access point.

5. The method of claim 1, wherein the first message is a radio link failure (RLF) indication message, and the second message is a handover report message.

6. The method of claim 1, wherein the second access point is a source cell, and the second message is sent from the first access point to the second access point.

7. The method of claim 1, wherein the second access point is a wrong cell, the third access point is a source cell, and the second message is sent from the first access point to the third access point.

8. The method of claim 2, wherein:
   the access terminal was handed-over from the second access point to the first access point; and
   the second message is sent to the second access point as a result of a determination that the first message was received within a defined period of time after the access terminal handoff is completed from the second access point to the first access point.

9. The method of claim 2, wherein the second message comprises an identifier of a cell at which the radio link failure occurred, an identifier of a cell at which the connection was re-established, and an identifier of the access terminal.

10. The method of claim 8, wherein the defined period of time commences upon sending of a message by the first access point requesting deletion of a data record pertaining to the access terminal in the second access point.

11. The method of claim 10, wherein:
    the data record comprises user equipment context; and
    the message requesting deletion of the data record comprises a context release request message.

12. The method of claim 8, further comprising configuring the defined period of time based on a message received from a network management system.

13. The method of claim 4, wherein the defined period of time commences upon sending of a message by the first access point requesting deletion of a data record pertaining to the access terminal in the third access point.

14. The method of claim 13, wherein:
    the data record comprises user equipment context; and
    the message requesting deletion of the data record comprises a context release request message.

15. The method of claim 4, further comprising configuring the defined period of time based on a message received from a network management system.

16. The method of claim 3, wherein the second message comprises an identifier of a cell at which the radio link failure occurred, an identifier of a cell at which the connection was re-established, an identifier of a handover source cell, and an identifier of the access terminal.

17. An apparatus for communication, comprising:
    a receiver configured to receive a first message at a first access point from a second access point, wherein the first access point is a target cell and the first message indicates that an access terminal re-establishing a connection at the second access point experienced radio link failure at the first access point; and
    a transmitter configured to send a second message from the first access point to one of the second access point or a third access point, wherein the second message comprises an indication of a type of handover failure associated with the radio link failure.

18. The apparatus of claim 17, wherein the indication comprises a too early handover indication.

19. The apparatus of claim 18, wherein:
the access terminal was handed-over from the second access point to the first access point; and
the second message is sent to the second access point as a result of a determination that the first message was received within a defined period of time after the access terminal handoff is completed from the second access point to the first access point.

20. The apparatus of claim 17, wherein the indication comprises a handover to wrong cell indication.

21. The apparatus of claim 20, wherein:
the access terminal was handed-over from the third access point to the first access point; and
the second message is sent to the third access point as a result of a determination point that the first message was received within a defined period of time after the access terminal handoff is completed from the third access point to the first access point.

22. An apparatus for communication, comprising:
means for receiving a first message at a first access point from a second access point, wherein the first access point is a target cell and the first message indicates that an access terminal re-establishing a connection at the second access point experienced radio link failure at the first access point; and
means for sending a second message from the first access point to one of the second access point or a third access point, wherein the second message comprises an indication of a type of handover failure associated with the radio link failure.

23. The apparatus of claim 22, wherein the indication comprises a too early handover indication.

24. The apparatus of claim 23, wherein:
the access terminal was handed-over from the second access point to the first access point; and
the second message is sent to the second access point as a result of a determination that the first message was received within a defined period of time after the access terminal handoff is completed from the second access point to the first access point.

25. The apparatus of claim 22, wherein the indication comprises a handover to wrong cell indication.

26. The apparatus of claim 25, wherein:
the access terminal was handed-over from the third access point to the first access point; and
the second message is sent to the third access point as a result of a determination point that the first message was received within a defined period of time after the access terminal handoff is completed from the third access point to the first access point.

27. A computer-program product, comprising:
a non-transitory computer-readable medium comprising code for causing a computer to:
receive a first message at a first access point from a second access point, wherein the first access point is a target cell and the first message indicates that an access terminal re-establishing a connection at the second access point experienced radio link failure at the first access point; and
send a second message from the first access point to one of the second access point or a third access point, wherein the second message comprises an indication of a type of handover failure associated with the radio link failure.

28. The computer-program product of claim 27, wherein the indication comprises a too early handover indication.

29. The computer-program product of claim 28, wherein:
the access terminal was handed-over from the second access point to the first access point; and
the second message is sent to the second access point as a result of a determination that the first message was received within a defined period of time after the access terminal handoff is completed from the second access point to the first access point.

30. The computer-program product of claim 27, wherein the indication comprises a handover to wrong cell indication.

31. The computer-program product of claim 30, wherein:
the access terminal was handed-over from the third access point to the first access point; and
the second message is sent to the third access point as a result of a determination point that the first message was received within a defined period of time after the access terminal handoff is completed from the third access point to the first access point.

32. A method of communication, comprising:
receiving a first message at a first access point from an access terminal, wherein the first message indicates that the access terminal re-establishing a connection at the first access point experienced radio link failure at a second access point, the first access point being a target cell and the second access point being a source cell; and
sending a second message from the first access point to the second access point, wherein the second message informs the second access point of the connection re-establishment of the access terminal to the first access point.

33. The method of claim 32, wherein the second message comprises an identifier of a cell at which the radio link failure occurred, an identifier of a cell at which the connection was re-established, and an identifier of the access terminal.

34. The method of claim 33, wherein the first message identifies the cell at which the radio link failure occurred.

35. The method of claim 32, wherein the first access point is an access point selected by the access terminal to re-establish the connection after the radio link failure at the second access point.

36. The method of claim 35, wherein the access terminal selects the first access point based on received signal strengths of access points detected by the access terminal.

37. The method of claim 32, wherein the radio link failure occurred as a result of inadequate configuration of handover triggering parameters at the second access point that caused handover from the second access point to the first access point to be triggered too late for successful handover.

38. The method of claim 32, wherein the radio link failure occurred as a result of inadequate configuration of handover triggering parameters at the second access point that caused the access terminal not to be handed-over.

39. An apparatus for communication, comprising:
a receiver configured to receive a first message at a first access point from an access terminal, wherein the first message indicates that the access terminal re-establishing a connection at the first access point experienced radio link failure at a second access point, the first access point being a target cell and the second access point being a source cell; and
a transmitter configured to send a second message from the first access point to the second access point, wherein the second message informs the second access point of the connection re-establishment of the access terminal to the first access point.

40. The apparatus of claim 39, wherein the second message comprises an identifier of a cell at which the radio link failure occurred, an identifier of a cell at which the connection was re-established, and an identifier of the access terminal.

41. The apparatus of claim 40, wherein the first message identifies the cell at which the radio link failure occurred.

42. An apparatus for communication, comprising:
means for receiving a first message at a first access point from an access terminal, wherein the first message indicates that the access terminal re-establishing a connection at the first access point experienced radio link failure at a second access point, the first access point being a target cell and the second access point being a source cell; and
means for sending a second message from the first access point to the second access point, wherein the second message informs the second access point of the connection re-establishment of the access terminal to the first access point.

43. The apparatus of claim 42, wherein the second message comprises an identifier of a cell at which the radio link failure occurred, an identifier of a cell at which the connection was re-established, and an identifier of the access terminal.

44. The apparatus of claim 43, wherein the first message identifies the cell at which the radio link failure occurred.

45. A computer-program product, comprising:
a non-transitory computer-readable medium comprising code for causing a computer to:
receive a first message at a first access point from the access terminal, wherein the first message indicates that an access terminal re-establishing a connection at the first access point experienced radio link failure at a second access point, the first access point being a target cell and the second access point being a source cell; and
send a second message from the first access point to the second access point, wherein the second message informs the second access point of the connection re-establishment of the access terminal to the first access point.

46. The computer-program product of claim 45, wherein the second message comprises an identifier of a cell at which the radio link failure occurred, an identifier of a cell at which the connection was re-established, and an identifier of the access terminal.

47. The computer-program product of claim 46, wherein the first message identifies the cell at which the radio link failure occurred.

48. A method of communication of a network management system, comprising:
configuring, by the network management system, at least one parameter for detecting handover failure of a handover of an access terminal from a source cell to a target cell, the at least one parameter comprising a parameter for determining whether the access terminal re-established a connection at the source cell or another cell other than the source cell or the target cell within a defined period of time after the access terminal handoff is completed from the source cell to the target cell; and
sending, by the network management system, the at least one parameter for detecting handover failure to at least one access point.

49. The method of claim 48, wherein the at least one parameter comprises a parameter for use by the target cell to determine whether the access terminal was handed-over too early.

50. The method of claim 48, wherein the at least one parameter comprises a parameter for use by the target cell to determine whether the access terminal was handed-over to a wrong cell, the wrong cell being the target cell.

51. The method of claim 48, wherein the network management system is an Operations, Administration, and Maintenance (OAM) system.

52. The method of claim 49, wherein the at least one parameter is configured to mitigate too early handovers.

53. The method of claim 49, wherein the at least one parameter comprises a parameter for use by the target cell to determine whether a radio link failure report is received for the access terminal within a defined period of time after the access terminal handoff is completed to the target cell.

54. The method of claim 50, wherein the at least one parameter is configured to mitigate handovers to wrong cells.

55. The method of claim 50, wherein the at least one parameter comprises a parameter for use by the target cell to determine whether a radio link failure report is received for the access terminal within a defined period of time after the access terminal handoff is completed to the target cell.

56. An apparatus for communication, the apparatus being a network management system, comprising:
a parameter configurer configured to configure at least one parameter for detecting handover failure of a handover of an access terminal from a source cell to a target cell, the at least one parameter comprising a parameter for determining whether the access terminal re-established a connection at the source cell or another cell other than the source cell or the target cell within a defined period of time after the access terminal handoff is completed from the source cell to the target cell; and
a communication controller configured to send the at least one parameter for detecting handover failure to at least one access point.

57. The apparatus of claim 56, wherein the at least one parameter comprises a parameter for use by the target cell to determine whether the access terminal was handed-over too early.

58. The apparatus of claim 56, wherein the at least one parameter comprises a parameter for use by the target cell to determine whether the access terminal was handed-over to a wrong cell, the wrong cell being the target cell.

59. The apparatus of claim 58, wherein the at least one parameter comprises a parameter for use by the target cell to determine whether a radio link failure report is received for the access terminal within a defined period of time after the access terminal handoff is completed to the target cell.

60. An apparatus for communication, the apparatus being a network management system, comprising:
means for configuring at least one parameter for detecting handover failure of a handover of an access terminal from a source cell to a target cell, the at least one parameter comprising a parameter for determining whether the access terminal re-established a connection at the source cell or another cell other than the source cell or the target cell within a defined period of time after the access terminal handoff is completed from the source cell to the target cell; and
means for sending the at least one parameter for detecting handover failure to at least one access point.

61. The apparatus of claim 60, wherein the at least one parameter comprises a parameter for use by the target cell to determine whether the access terminal was handed-over too early.

62. The apparatus of claim 61, wherein the at least one parameter comprises a parameter for use by the target cell to determine whether a radio link failure report is received for the access terminal within a defined period of time after the access terminal handoff is completed to the target cell.

63. The apparatus of claim 60, wherein the at least one parameter comprises a parameter for use by the target cell to determine whether an access terminal was handed-over to a wrong cell.

64. The apparatus of claim 63, wherein the at least one parameter comprises a parameter for use by the target cell to determine whether a radio link failure report is received for the access terminal within a defined period of time after the access terminal handoff is completed to the target cell.

65. A computer-program product in a network management system, comprising:
- a non-transitory computer-readable medium comprising code for causing a computer to:
- configure at least one parameter for detecting handover failure of a handover of an access terminal from a source cell to a target cell, the at least one parameter comprising a parameter for determining whether the access terminal re-established a connection at the source cell or another cell other than the source cell or the target cell within a defined period of time after the access terminal handoff is completed from the source cell to the target cell; and
- send the at least one parameter for detecting handover failure to at least one access point.

66. The computer-program product of claim 65, wherein the at least one parameter comprises a parameter for use by the target cell to determine whether an access terminal was handed-over too early.

67. The computer-program product of claim 66, wherein the at least one parameter comprises a parameter for use by the target cell to determine whether a radio link failure report is received for the access terminal within a defined period of time after the access terminal handoff is completed to the target cell.

68. The computer-program product of claim 65, wherein the at least one parameter comprises a parameter for use by the target cell to determine whether the access terminal was handed-over to a wrong cell.

69. The computer-program product of claim 68, wherein the at least one parameter comprises a parameter for use by the target cell to determine whether a radio link failure report is received for the access terminal within a defined period of time after the access terminal handoff is completed to the target cell.

* * * * *